United States Patent
Ehrlich

(10) Patent No.: US 11,189,309 B1
(45) Date of Patent: Nov. 30, 2021

(54) SPLIT-ACTUATOR DRIVE THAT COORDINATES TIMING OF AGGRESSOR AND VICTIM FOR EFFECTIVE VICTIM DISTURBANCE-FEEDFORWARD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Richard M. Ehrlich, Saratoga, CA (US)

(73) Assignees: KABUSHIKI KAISHA TOSHIBA, Tokyo (JP); TOSHIBA ELECTRONIC DEVICES & STORAGE CORPORATION, Tokyo (JP)

(*) Notice: Subject to any disclaimer, the term of this patent is extended or adjusted under 35 U.S.C. 154(b) by 0 days.

(21) Appl. No.: 17/166,824

(22) Filed: Feb. 3, 2021

(51) Int. Cl.
| | |
|---|---|
| *G11B 5/54* | (2006.01) |
| *G11B 5/58* | (2006.01) |
| *G11B 5/55* | (2006.01) |
| *G11B 5/48* | (2006.01) |

(52) U.S. Cl.
CPC ............ *G11B 5/553* (2013.01); *G11B 5/4886* (2013.01)

(58) Field of Classification Search
CPC ......... G11B 27/36; G11B 5/00; G11B 15/087; G11B 15/52; G11B 5/54; G11B 20/20; G11B 5/5539; G11B 5/58; G11B 5/59633
USPC .... 360/48, 55, 72.2, 73.13, 75, 77.01, 77.06
See application file for complete search history.

(56) References Cited

U.S. PATENT DOCUMENTS

| | | | |
|---|---|---|---|
| 6,493,172 B1 | 12/2002 | Morris et al. | |
| 9,087,541 B1* | 7/2015 | Pokharel | ............ G11B 5/59688 |
| 9,792,938 B1 | 10/2017 | Kobayashi et al. | |
| 9,934,803 B1 | 4/2018 | Semba et al. | |

* cited by examiner

*Primary Examiner* — Nabil Z Hindi
(74) *Attorney, Agent, or Firm* — Kim & Stewart LLP

(57) ABSTRACT

A victim feedforward signal is added to a microactuator control signal of the victim actuator in response to a voice-coil motor (VCM) control signal that is applied to the aggressor actuator, where the victim feedforward signal is configured to compensate for disturbances to a victim head caused by assertion of the aggressor VCM control signal. Each aggressor VCM control signal is asserted at a specific time by the aggressor actuator, for example in response to the aggressor head passing over a first servo wedge. A feedforward signal that compensates for the effect of the aggressor VCM control signal is then determined based on the aggressor VCM control signal, stored, and asserted via the victim microactuator at a predetermined time relative to when the aggressor VCM control signal is asserted.

20 Claims, 17 Drawing Sheets

674

| VCM Command Entries 701 | Servo Wedge Number 702 |
|---|---|
| +25 | 103 |
| +18 | 104 |
| -11 | 105 |
| +10 | 106 |
| -6 | 107 |
| +15 | 108 |
| -16 | 109 |
| +12 | 110 |
| +11 | 111 |
| -23 | 112 |
| +12 | 113 |
| ... | ... |

| VCM Command Entries 701 | VCM Command Entries 701 | Servo Wedge Number 702 |
|---|---|---|
| +25 | +22 | 103 |
| +18 | +16 | 104 |
| -11 | -12 | 105 |
| +10 | +10 | 106 |
| -6 | -5 | 107 |
| +15 | +17 | 108 |
| -16 | -18 | 109 |
| +12 | +14 | 110 |
| +11 | +13 | 111 |
| -23 | -28 | 112 |
| +12 | +14 | 113 |
| ⋮ | ⋮ | ⋮ |

| VCM Command Entries 751 | Servo Wedge Number 752 |
|---|---|
| +25 | 103 |
| +18 | 104 |
| +12 | 113 |
| ⋮ | ⋮ |

| Victim Feedforward Entries 801 | Servo Wedge Number 802 |
|---|---|
| -32 | 103 |
| -28 | 104 |
| -22 | 105 |
| -17 | 106 |
| -9 | 107 |
| -5 | 108 |
| +10 | 109 |
| +2 | 110 |
| -1 | 111 |
| -17 | 112 |
| -19 | 113 |
| ⋮ | ⋮ |

FIG. 8

SPLIT-ACTUATOR DRIVE THAT COORDINATES TIMING OF AGGRESSOR AND VICTIM FOR EFFECTIVE VICTIM DISTURBANCE-FEEDFORWARD

BACKGROUND

Magnetic hard disk drives (HDDs) have been employed in information technology as a low-cost means for providing random access to large quantities of data. As the need for data storage has expanded, the areal density of information stored in HDDs has continuously increased. In addition to high storage capacity, the ability of an HDD to access stored data quickly is also important. To meet the ever-increasing requirements for high access performance and faster throughput, HDDs have been configured with multiple rotary actuators and associated read/write channels that are designed to operate simultaneously. Thus, each rotary actuator enables the independent positioning of one or more magnetic heads for reading and writing data, thereby greatly increasing the throughput of such HDDs.

One drawback to the use of independent rotary actuators is that the mechanical interaction between such actuators can affect positioning accuracy of the magnetic heads when both actuators are in motion. For example, when one actuator is seeking to a targeted data track, the high accelerations and changes in acceleration of the actuator can generate vibrations which will significantly affect the positioning accuracy of the other actuator while the other actuator is track following. Consequently, there is a need in the art for reducing the effect of one actuator in a multi-actuator drive on the positioning accuracy of another actuator in the multi-actuator drive.

SUMMARY

One or more embodiments provide systems and methods for reducing or compensating for the effect of moving a first actuator (the so-called "aggressor actuator") in a multi-actuator drive on a second actuator (the so-called "victim actuator") in the drive. Specifically, a victim feedforward signal is added to a microactuator control signal of the victim actuator in response to a voice-coil motor (VCM) control signal that is asserted by the aggressor actuator, where the victim feedforward signal is configured to compensate for disturbances to a victim head caused by assertion of the aggressor VCM control signal. In the embodiments, each aggressor VCM control signal is asserted at a specific time by the aggressor actuator, for example in response to the aggressor head passing over a first servo wedge. A feedforward signal that compensates for the effect of the aggressor VCM control signal is then determined based on the aggressor VCM control signal, stored, and asserted via the victim microactuator at a predetermined time relative to when the aggressor VCM control signal is asserted. For example, in some embodiments, the predetermined time may be based on when the victim head passes over a second servo wedge, where the victim head passes over the second servo wedge after the aggressor head passes over the first servo wedge. Thus, assertion of a victim feedforward signal via the victim actuator is synchronized with assertion of the aggressor VCM control signal on which the victim feedforward signal is based. In this way, the victim feedforward signal is asserted after the aggressor VCM control signal is asserted by a fixed time interval, and variations in the time that elapses in calculating the victim feedforward signal do not affect when the victim feedforward signal is asserted.

BRIEF DESCRIPTION OF THE DRAWINGS

So that the manner in which the above recited features of embodiments can be understood in detail, a more particular description of embodiments, briefly summarized above, may be had by reference to the appended drawings. It is to be noted, however, that the appended drawings illustrate only typical embodiments and are therefore not to be considered limiting of its scope, for the invention may admit to other equally effective embodiments.

FIG. 7A schematically illustrates an aggressor VCM command buffer, according to an embodiment.

FIG. 7B schematically illustrates an aggressor VCM command buffer, according to another embodiment.

FIG. 7C schematically illustrates a recent aggressor VCM command buffer, according to an embodiment.

FIG. 8 schematically illustrates a victim feedforward value buffer, according to an embodiment.

For clarity, identical reference numbers have been used, where applicable, to designate identical elements that are common between figures. It is contemplated that features of one embodiment may be incorporated in other embodiments without further recitation.

DETAILED DESCRIPTION

System Overview

Figure 1:
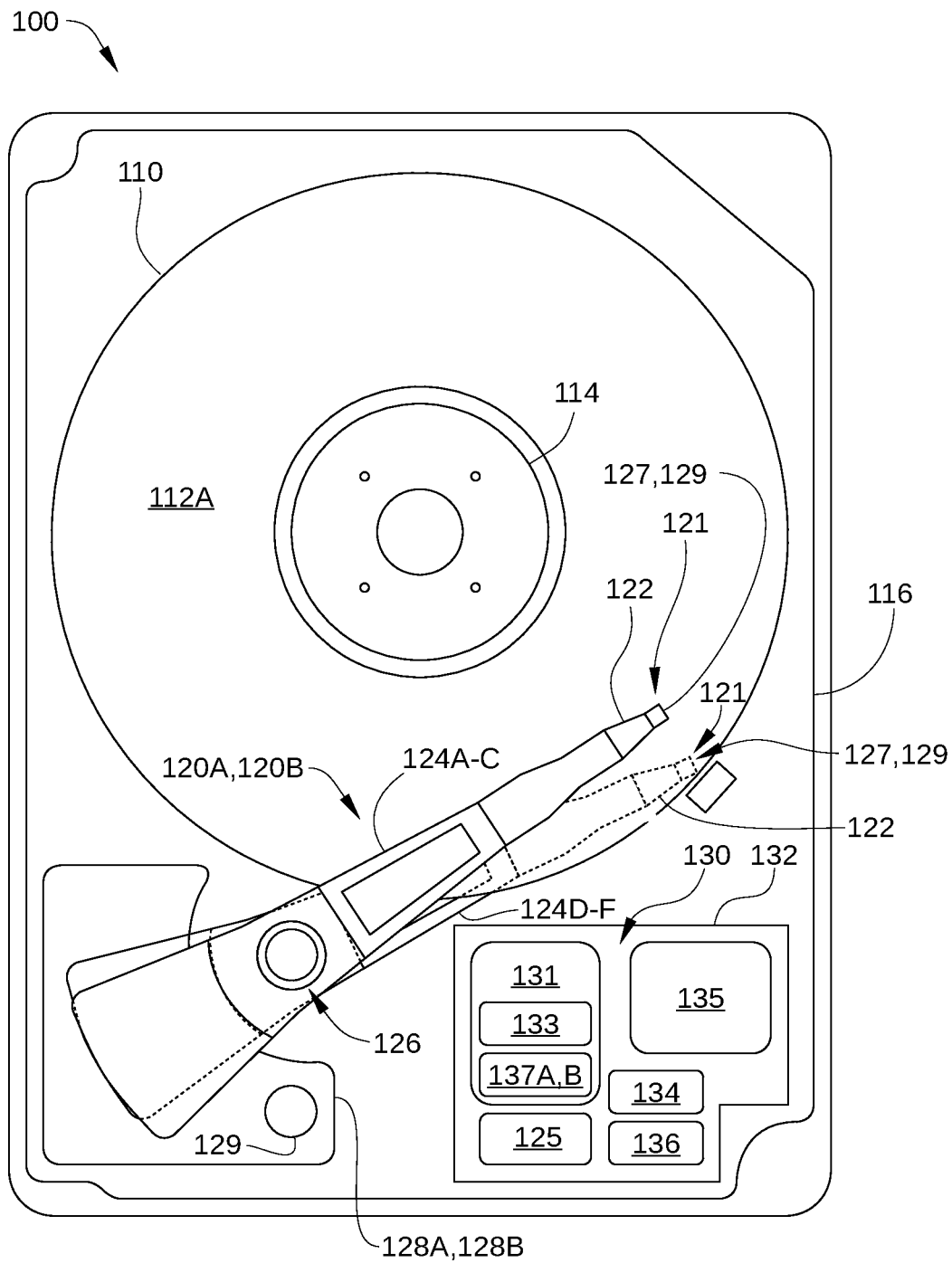
FIG. 1 is a schematic view of an exemplary hard disk drive (HDD), according to an embodiment.

FIG. 1 is a schematic view of an exemplary hard disk drive (HDD) 100, according to one embodiment. For clarity, HDD 100 is illustrated without a top cover. HDD 100 is a multiple actuator drive, and includes one or more storage disks 110, each including one or two recording surfaces on which a plurality of concentric data storage tracks are disposed. In FIG. 1, only the top recording surface 112A of storage disk 110 is visible. The one or more storage disks 110 are coupled to and rotated by a spindle motor 114 that is mounted on a base plate 116. Two or more actuator arm assemblies 120A and 120B are also mounted on base plate 116, and each of the assemblies includes one or more arm-mounted sliders 121 with one or more magnetic read/write heads 127 that read data from and write data to the data storage tracks of an associated recording surface, such as recording surface 112A.

One or more actuator arms 124 are included in actuator arm assembly 120A, and one or more actuator arms 124 are included in actuator arm assembly 120B. Actuator arm assembly 120A and the one or more actuator arms 124 included therein are rotated together about a bearing assembly 126 by a voice coil motor (VCM) 128A independently from actuator arm assembly 120B. Likewise, actuator arm assembly 120B and the one or more actuator arms 124 included therein are rotated together about bearing assembly 126 by a VCM 128B independently from actuator arm assembly 120A. Thus, each of VCMs 128A and 128B moves a group of the sliders 121 and read/write heads 127 radially relative to a respective recording surface of a storage disk 110 included in HDD 100, thereby providing radial positioning of a corresponding read/write head 127 over a desired concentric data on a recording surface, for example on recording surface 112A. Spindle motor 114, the read/write heads 127, and VCMs 128A and 128B are coupled to electronic circuits 130, which are mounted on a printed circuit board 132.

Electronic circuits 130 include read channels 137A and 137B, a microprocessor-based controller 133, random-access memory (RAM) 134 (which may be a dynamic RAM and is used as one or more data buffers) and/or a flash memory device 135, and, in some embodiments, a flash manager device 136. In some embodiments, read channels 137A and 137B and microprocessor-based controller 133 are included in a single chip, such as a system-on-chip (SoC) 131. HDD 100 further includes a motor-driver chip 125 that accepts commands from microprocessor-based controller 133 and drives spindle motor 114, and VCMs 128A and 128B and microactuators 228 and/or 229 (not shown in FIG. 1). In the embodiment illustrated in FIG. 1, HDD 100 is shown with a single motor-driver chip 125 that drives spindle motor 114 and VCMs 128A and 128B. In other embodiments, HDD 100 includes multiple motor-driver chips. In one such embodiment, for example, one motor-driver chip drives spindle motor 114, one actuator (e.g., VCM 128A), and one microactuator (e.g., microactuator 228), and the other motor-driver chip drives the other actuator (e.g., VCM 128B) and another microactuator (e.g., microactuator 229). Further, in other embodiments, any other partition of the jobs of spindle motor control, actuator control, and microactuator control can be implemented. Via a preamplifier (not shown), read/write channel 137A communicates with read/write heads 127 of actuator arm assembly 120A and read/write channel 137B communicates with read/write heads 127 of actuator arm assembly 120B. The preamplifiers are mounted on a flex-cable, which is mounted on either base plate 116, one of actuators 120A or 120B, or both.

When data are transferred to or from a particular recording surface of HDD 100, one of the actuator arm assemblies 120A or 120B moves in an arc between the inner diameter (ID) and the outer diameter (OD) of the storage disk 110. The actuator arm assembly accelerates in one angular direction when current is passed in one direction through the voice coil of the corresponding VCM and accelerates in an opposite direction when the current is reversed, thereby allowing coarse control of the radial position of the actuator arm assembly and the attached read/write head with respect to the particular storage disk 110.

Fine radial positioning of each read/write head 127 is accomplished with a respective microactuator 129. The microactuator 129 for each read/write head 127 is mechanically coupled to the actuator arm 124 that corresponds to the read/write head 127. Each microactuator 129 typically includes one or more piezoelectric elements and is configured to move a corresponding read/write head 127 radially a small distance, for example on the order of a few tens or hundreds of nanometers. When employed together, microactuators 129 and voice coil motors 128A and 128B are sometimes referred to as dual-stage actuators, where voice coil motor 128A or 128B is the prime mover and each microactuator 129 is a second-stage actuator. Dual-stage actuators enable the servo system of HDD 100 to attain more accurate tracking control.

In some embodiments, each microactuator 129 is mounted on a respective flexure arm 122, at a gimbal between the respective flexure arm 122 and the corresponding slider 121. In such embodiments, each microactuator 129 rotates the corresponding slider 121, causing radial motion (relative to corresponding recording surface) of the corresponding read/write head 127. Alternatively or additionally, in some embodiments, each microactuator 129 is mounted on an end of an actuator arm 124 or on the flexure arm, itself, and moves the flexure arm 122 through a relatively large arc, for example on the order of a hundred track widths. In yet other embodiments, each microactuator 129 includes a first piezoelectric or other movable element at the gimbal between the respective flexure arm 122 and the corresponding slider 121 and a second piezoelectric or other movable element at the end of the actuator arm 124 or on the flexure arm. In such embodiments, each read/write head 127 is provided with three-stage actuation in the radial direction.

In the embodiment illustrated in FIG. 1, only one slider 121, one flexure arm 122, one actuator arm 124, and one read/write head 127 are shown for actuator arm assembly 120A and only one slider 121, one flexure arm 122, one actuator arm 124, and one read/write head 127 are shown for actuator arm assembly 120B. In other embodiments, each of actuator arm assemblies 120A and 120B can include a plurality of actuator arms, sliders, flexure arms, and read/write heads. Further, in some embodiments, HDD 100 can include more than two actuator arm assemblies, each rotated about bearing assembly 126 by a respective VCM independently from each other. In other embodiments, additional actuators may rotate about other bearing assemblies.

Figure 2:
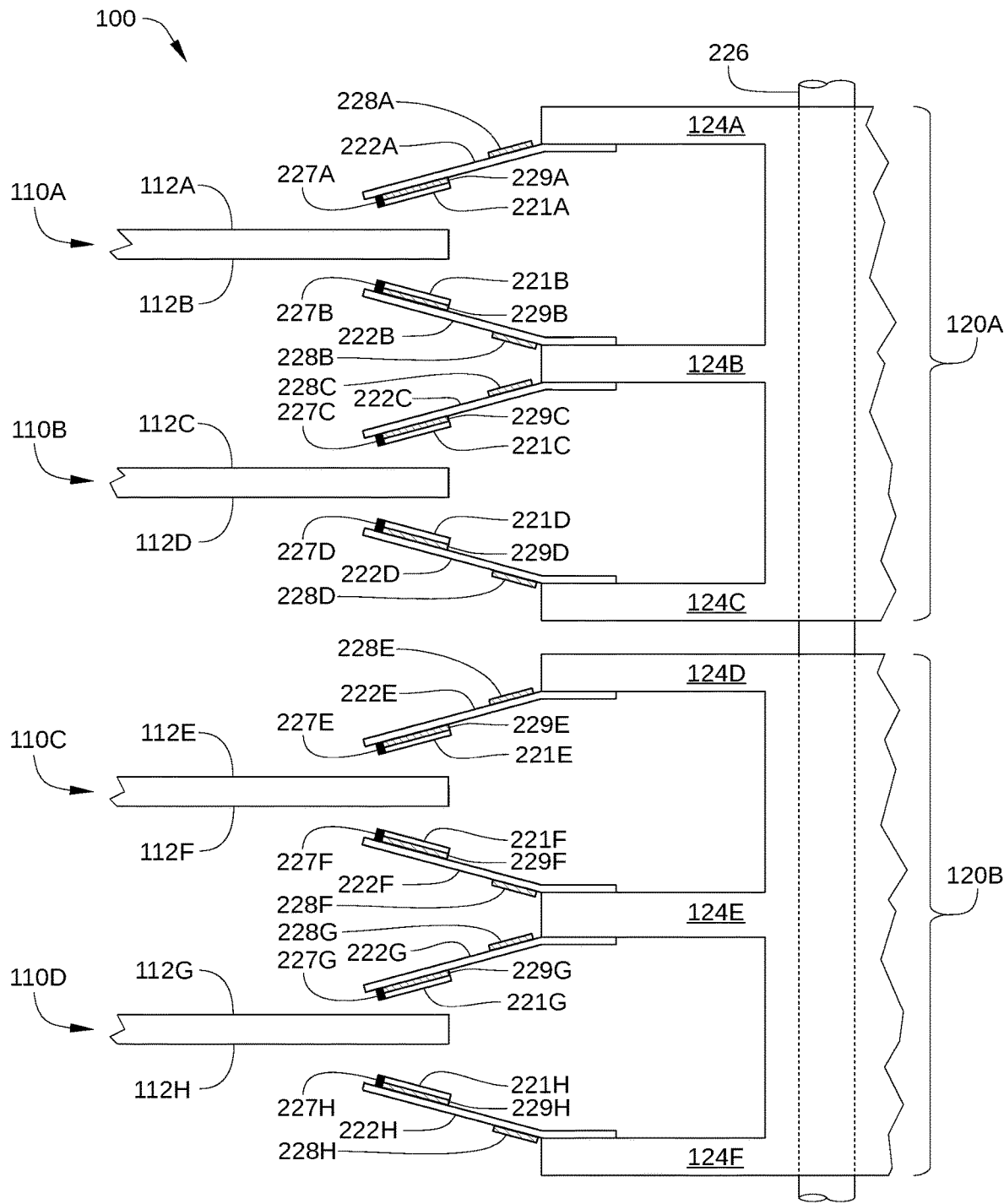
FIG. 2 schematically illustrates a partial side-view of multiple storage disks and two independent actuator arm assemblies of the HDD of FIG. 1.

FIG. 2 schematically illustrates a partial side-view of multiple storage disks 110A-110D and two independent actuator arm assemblies 120A and 120B of HDD 100, according to an embodiment. The recording surfaces of multiple storage disks 110A and 110B are each accessed by one of the read/write heads included in the independent actuator arm assembly 120A (e.g., read/write heads 227A, 227B, 227C, and 227D), and the recording surfaces of multiple storage disks 110C and 110D are each accessed by the read/write heads included in the independent actuator arm assembly 120B (e.g., read/write heads 227E, 227F, 227G, and 227H). Thus, in the embodiment illustrated in FIG. 2, HDD 100 is configured with multiple storage disks 110A-110D having a total of eight recording surfaces 112A-112H and multiple read/write heads 227A-227H, each corresponding to one of these recording surfaces. Specifically, in the embodiment illustrated in FIG. 2, HDD 100 includes: a storage disk 110A with recording surfaces 112A and 112B; a storage disk 110B with recording surfaces 112C and 112D; a storage disk 110C with recording surfaces 112E and 112F; and a storage disk 110D with recording surfaces 112G and 112H. Thus, read/write head 227A reads data from and writes data to recording surface 112A, read/write head 227B reads data from and writes data to corresponding recording surface 112B, and so on.

Read/write heads 227A-227H are disposed on sliders 221A-221H, respectively, and sliders 221A-221H (referred to collectively herein as sliders 221) are respectively coupled to actuator arms 124A-124F via flexure arms 222A-222H (referred to collectively herein as flexure arms 222) as shown. In some embodiments, each of sliders 221A-221H is mounted on a corresponding one of flexure arms 222 via a microactuator 229A-229H (referred to collectively herein as microactuators 229), such as a micro-actuator (MA) second stage that includes two lead zirconate titanate piezoelectric actuators attached to a baseplate of the corresponding flexure arm 222. Alternatively, in some embodiments, each of sliders 221A-221H is mounted directly on a corresponding one of flexure arms 222.

In the embodiment illustrated in FIG. 2, flexure arm 222A is coupled to an actuator arm 124A, flexure arms 222B and 222C are coupled to an actuator arm 124B, flexure arm 222D is coupled to an actuator arm 124C, flexure arm 222E is coupled to an actuator arm 124D, flexure arms 222F and 222G are coupled to an actuator arm 124E, and flexure arm 222H is coupled to an actuator arm 124F. Actuator arms 124A-124F are referred to collectively herein as actuator arms 124. In the embodiment illustrated in FIG. 2, each of microactuators 228A-228H (referred to collectively herein as microactuators 228) is disposed at a base of flexure arms 222A-222H, respectively, i.e., at an end of one of actuator arms 124. Alternatively or additionally, in some embodiments, microactuators 229A-229H can be disposed proximate sliders 221A-221H, respectively, i.e., at a tip of flexure arms 222A-222H, respectively. In embodiments in which microactuators 229 are disposed proximate sliders 221, each of microactuators 229 can include a gimbal microactuator. In either case, each of microactuators 229 and/or 228 compensates for perturbations in the radial position of sliders 221, so that read/write heads 227A-227H follow the proper data track on recording surfaces 112. Thus, microactuators 229 can compensate for vibrations of the disk, inertial events such as impacts to HDD 100, and irregularities in recording surfaces 112 or in the written servo-pattern.

Actuator arms 124A-124C are included in actuator arm assembly 120A, and actuator arms 124D-124F are included in actuator arm assembly 120B. In an embodiment of the invention, actuator arm assemblies 120A and 120B are independently controlled and both rotate about bearing assembly 126 (which includes a same shaft axis 226).

In positioning one of read/write heads 227A-227H over a corresponding recording surface (i.e., one of recording surfaces 112A-112H), the servo system determines an appropriate current to drive through the voice coil of the appropriate voice coil motor (i.e., either VCM 128A or 128B), and drives said current using a current driver and associated circuitry, e.g., included in motor-driver chip 125. Typically, the appropriate current is determined based in part on a position feedback signal of the read/write head 127, i.e., a position error signal (PES). The PES is typically generated by using servo patterns included in the servo wedges on the recording surface as a reference. One embodiment of such a recording surface 112 is illustrated in FIG. 3.

Figure 3:
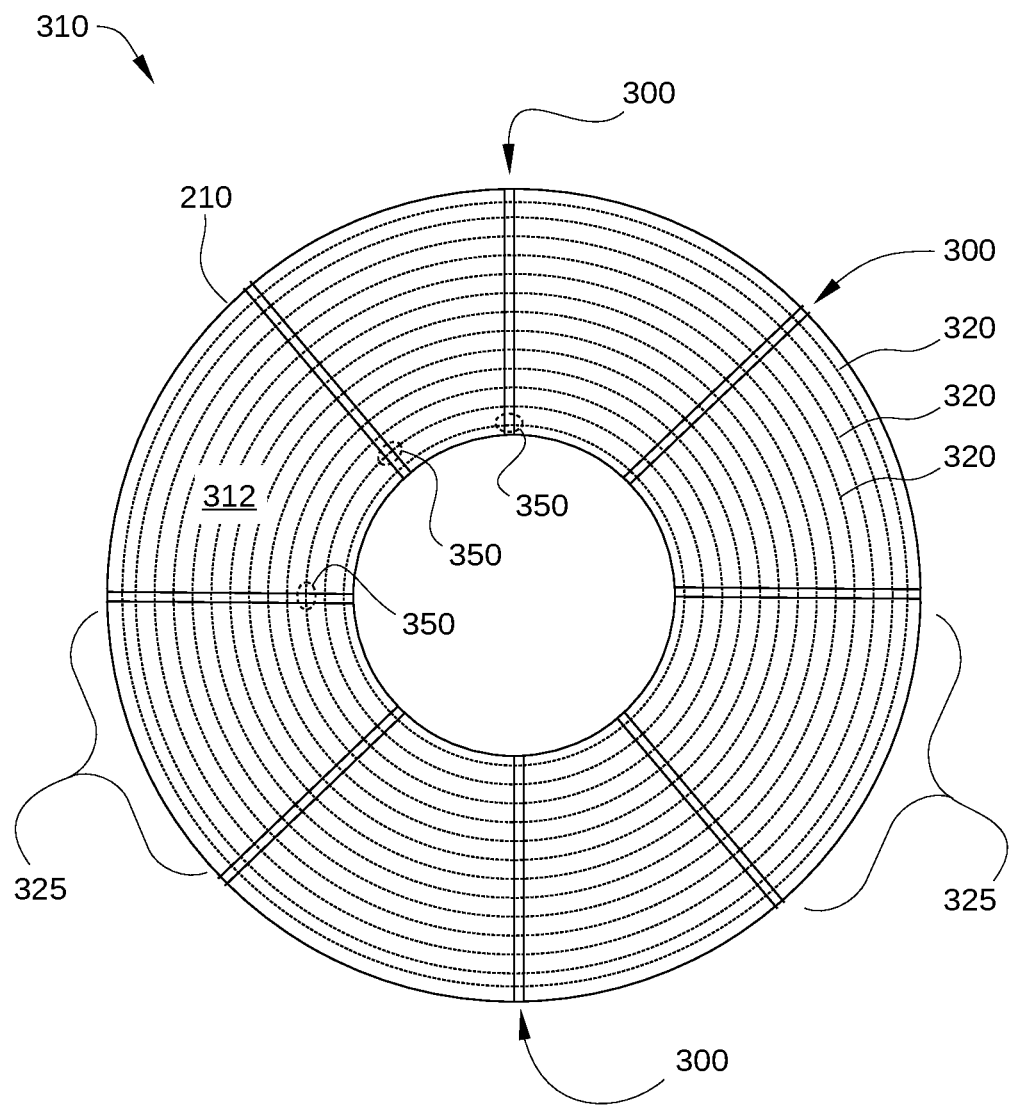
FIG. 3 illustrates a recording surface of a storage disk with servo wedges and concentric data storage tracks formed thereon, according to an embodiment.

FIG. 3 illustrates a recording surface 312 of a storage disk 310 with servo wedges 300 and concentric data storage tracks 320 formed thereon, according to an embodiment. Recording surface 312 can be any of recording surfaces 112A-112H in FIG. 2. Servo wedges 300 may be written on recording surface 312 by either a media writer, or by HDD 100 itself via a self-servo-write (SSW) process. Servo wedges 300 are typically radially aligned. In practice, servo wedges 300 may be somewhat curved. For example, servo wedges 300 may be configured in a spiral pattern that mirrors the path that would be followed by a corresponding read/write head 127 (shown in FIG. 1) if the read/write head 127 were to be moved across the stroke of one of actuator arm assemblies 120A or 120B while storage disk 310 is not spinning. Such a curved pattern advantageously results in the wedge-to-wedge timing being independent of the radial position of the read/write head 127. For simplicity, servo wedges 300 are depicted as substantially straight lines in FIG. 3. Each servo wedge 300 includes a plurality of servo sectors 350 containing servo information that defines the radial position and track pitch, i.e., spacing, of data storage tracks 320.

Data storage tracks 320 for storing data are located in data sectors 325, and are positionally defined by the servo information written in servo sectors 350. The region between two servo sectors may contain more than, equal to, or less than one data sector, including the possibility of fractional data-sectors. Each servo sector 350 encodes a reference signal that is read by the read/write head 127 as the read/write head 127 passes over the servo sector. Thus, during read and write operations, the read/write head 127 can be positioned above a desired data storage track 320. Typically, the actual number of data storage tracks 320 and servo wedges 300 included on recording surface 312 is considerably larger than that illustrated in FIG. 3. For example, recording surface 312 may include hundreds of thousands of concentric data storage tracks 320 and hundreds of servo wedges 300.

As noted previously, when one actuator of a multiple-actuator HDD (the so-called "aggressor actuator") is seeking to a targeted data storage track, cross-actuator coupling can generate vibrations which will significantly affect the positioning accuracy of the other actuator (the so-called "victim actuator"). In particular, the high accelerations and changes in acceleration of the aggressor actuator are likely to affect the positioning accuracy of the victim actuator when the victim actuator is attempting to closely follow a specific data track, for example during a read or write operation. According to various embodiments described herein, a feedforward control signal is asserted to reduce or compensate for the effect on the victim actuator when moving the aggressor actuator. Specifically, the victim feedforward control signal is added to a microactuator control signal of the victim actuator in response to a VCM control signal that is applied to the aggressor actuator. Determination and assertion of such a victim feedforward signal in a conventional multi-actuator HDD is described in conjunction with FIG. 4, and determination and assertion of a victim feedforward signal according to various embodiments is described in conjunction with FIG. 5.

Figure 4:
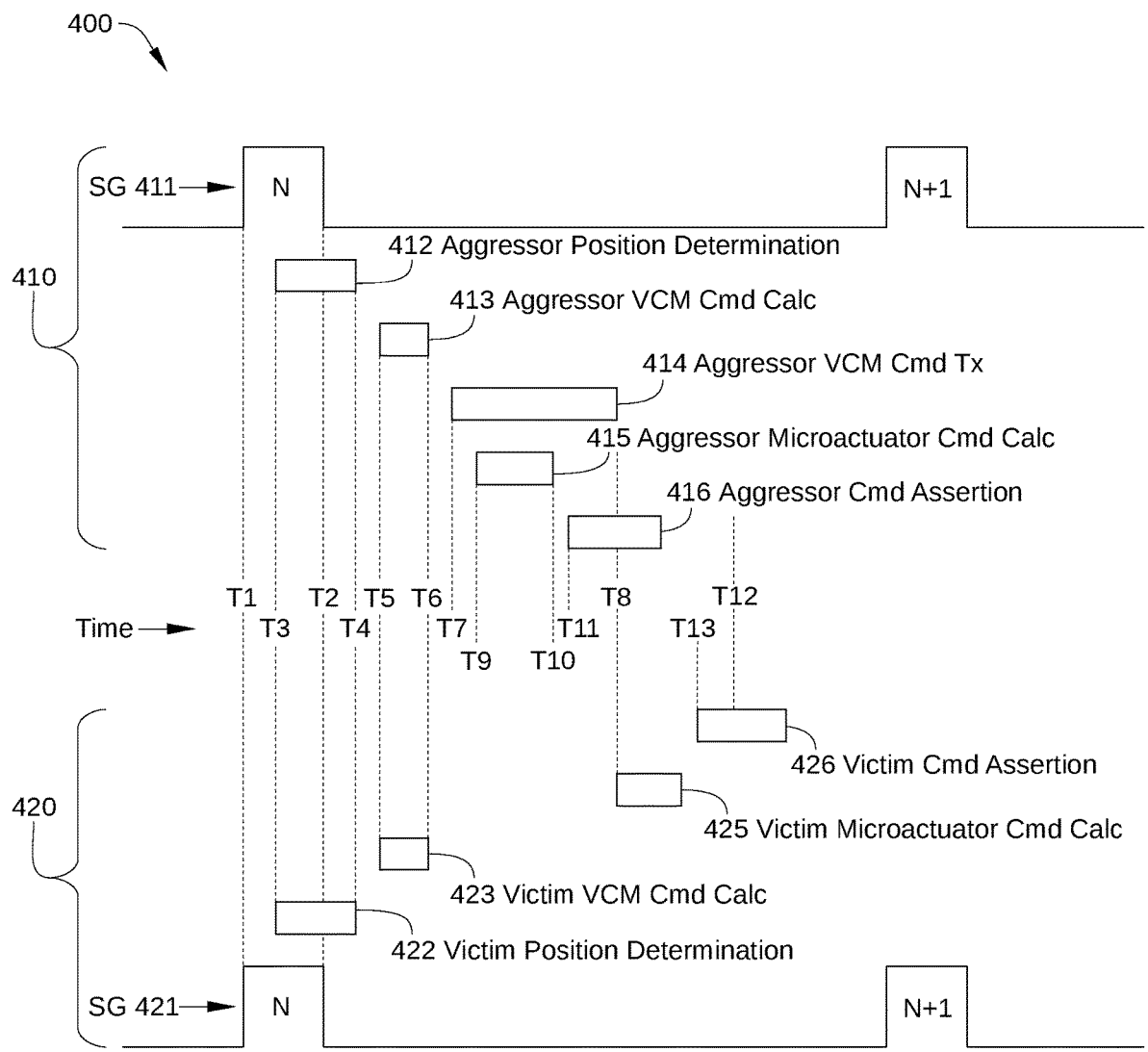
FIG. 4 is a timing diagram illustrating determination and assertion of a victim feedforward signal in a conventional multi-actuator HDD.

FIG. 4 is a timing diagram 400 illustrating determination and assertion of a victim feedforward signal in a conventional multi-actuator HDD. Timing diagram 400 depicts the relative timing of various operations 410 performed by a servo system for positioning an aggressor actuator (e.g., VCM 128A and a suitable microactuator 229 and/or 228) and various operations 420 performed by a servo system for positioning a victim actuator (e.g., VCM 128B and a suitable microactuator 229 and/or 228). Generally, an actuator of a multi-actuator HDD is considered a victim actuator while performing a position-sensitive operation, such as a servoing over a data track to read data from and/or write data to the data track. An actuator of a multi-actuator HDD is considered an aggressor actuator when performing a seek operation while another actuator of the multi-actuator HDD is currently a victim actuator.

In the embodiment illustrated in FIG. 4, various consecutive operations included in operations 410 and operations 420 are illustrated separated by discrete time intervals for clarity. In practice, there may be no time intervals separating some or all such operations. Further, in the embodiment illustrated in FIG. 4, most of operations 410 and operations 420 are illustrated being performed sequentially. In practice, various operations included in operations 410 and/or operations 420 may begin before a preceding operation has completed, and/or in a different order, except where explicitly stated below.

Operations 410 include opening and closing of an aggressor servo gate 411, an aggressor head current position determination 412, a next aggressor VCM command calculation 413, an aggressor VCM command transmission 414, a next aggressor microactuator command calculation 415, and an aggressor actuator command assertion 416. Operations 420 include opening and closing of an aggressor servo gate 421, a victim head current position determination 422, a next victim VCM command calculation 423, a next victim microactuator command calculation 425, and a victim actuator command assertion 426.

Aggressor servo gate 411 is timed to open at a time T1 and close at a time T2. Time T1 is a point in time at or slightly before the aggressor head begins passing over a particular servo wedge disposed on the recording surface of an HDD that corresponds to the aggressor head, and time T2 is a point in time at or slightly after the aggressor head has passed over that particular servo wedge. Thus, aggressor servo gate 411 is configured to enable a read channel (e.g., read channel 137A) to generate a signal while the aggressor head passes over a particular servo wedge. In the instance illustrated in FIG. 4, aggressor servo gate 411 is illustrated for servo wedges N and N+1.

Aggressor head current position determination 412 is performed beginning at a time T3 in response to the aggressor head generating position signals as the aggressor head passes over a servo wedge and ends at a subsequent time T4. Aggressor head current position determination 412 involves the decoding of such position signals, for example via a read channel, and the determination of the PES for the aggressor head at the current servo wedge. In the instance illustrated in FIG. 4, aggressor head current position determination 412 is shown being performed for servo wedge N, but aggressor head current position determination 412 is also performed for wedges N+1, N+2 (not shown), and so on.

Next aggressor VCM command calculation 413 is performed beginning at a time T5 and ending at a time T6. During next aggressor VCM command calculation 413, the next VCM command to be asserted by the aggressor actuator is determined based on various factors, including the current PES for the aggressor head (determined in aggressor head current position determination 412), a target velocity profile for the aggressor head, and the like.

Aggressor VCM command transmission 414 is performed beginning at time T7 and ending at a time T8, where time T7 is a point in time after the completion of next aggressor VCM command calculation 413. In aggressor VCM command transmission 414, the next aggressor VCM command to be asserted by the aggressor actuator is transmitted to the servo system controlling the position of the victim head, or to suitable logic communicatively coupled thereto. A victim microactuator command can be generated by the servo system controlling the position of the victim head based, at least in part, on the next aggressor VCM command to be performed by the aggressor actuator. That is, a victim feedforward signal is determined based on the next aggressor VCM command and is added to the next victim microactuator command, thereby compensating for the effect of the next aggressor VCM command on the position of the victim head. It is noted that such a victim feedforward signal cannot be calculated (for example by the servo system controlling the position of the victim head) until after completion of aggressor VCM command transmission 414 at time T8.

In the instance shown in FIG. 4, next aggressor microactuator command calculation 415 is performed beginning at a time T9 and ending at a time T10, where time T9 occurs at some point after the completion of next aggressor VCM command calculation 413 at time T6. Alternatively, in some embodiments, next aggressor microactuator command calculation 415 may occur before or in parallel with next aggressor VCM command calculation 413, and may be completed before aggressor VCM command transmission 414 begins. During next aggressor microactuator command calculation 415, the next microactuator command to be asserted by the aggressor actuator is determined based on various factors, including the current PES for the aggressor head, the target velocity profile for the aggressor head, and the like. In the instance illustrated in FIG. 4, next aggressor microactuator command calculation 415 and aggressor VCM command transmission 414 begin at different times, but in general, aggressor microactuator command calculation 415 can begin at any suitable time after the completion of aggressor position determination 412 at time T4 and aggressor VCM command transmission 414 can begin at any suitable time after the completion of next aggressor VCM command calculation 413 at time T6. For example, in one such embodiment, next aggressor microactuator command calculation 415 and aggressor VCM command transmission 414 both begin at time T7.

Aggressor actuator command assertion 416 is performed beginning at a time T11, which is a point in time after the completion of next aggressor microactuator command calculation 415 at time T10. During aggressor actuator command assertion 416, the next aggressor VCM command to be performed is asserted by the aggressor VCM and the next aggressor microactuator command to be performed is asserted by the aggressor microactuator. In some embodiments, aggressor actuator command assertion 416 is completed no later than a target time T12 to ensure that the position of the aggressor head is modified in a timely fashion, for example, prior to passing over the next wedge (in this case wedge N+1).

In alternative embodiments, the next aggressor VCM command to be asserted and the next aggressor microactuator command to be asserted are not asserted concurrently in aggressor actuator command assertion 416 as shown in FIG. 4. In such embodiments, the next aggressor VCM command to be asserted is asserted by the aggressor VCM upon completion of next aggressor VCM command calculation 413, and the next aggressor microactuator command to be asserted is asserted by the aggressor microactuator upon completion of next aggressor microactuator command calculation 415. In such embodiments, the next aggressor VCM command to be asserted and the next aggressor microactuator command to be asserted may be asserted concurrently or sequentially (in any order). Further, in some embodiments, next aggressor microactuator command calculation 415 may be executed before or concurrently with next aggressor VCM command calculation 413.

Operations 420 include operations performed by the servo system that controls the position of the victim head and are substantially similar to those described above for operations performed by the servo system that controls the position of the aggressor head. Furthermore, in the instance illustrated in FIG. 4, the servo wedges on the recording surface accessed by the aggressor head are circumferentially aligned with the servo wedges on the recording surface accessed by the victim head. Thus, when the aggressor head passes over wedge N of the recording surface corresponding to the aggressor head, the victim head simultaneously passes over wedge N of the recording surface corresponding to the victim head. As a result, victim servo gate 421 is also timed to open at time T1 and close at time T2; victim head current position determination 422 is performed beginning at approximately time T3 and ends at approximately time T4; and next victim VCM command calculation 423 is performed beginning at approximately time T5 and ending at approximately time T6. Further, to ensure that the position of the victim head is modified prior to passing over the next wedge, aggressor actuator command assertion 426 generally occurs no later than target time T12. In alternative instances, the servo wedges associated with the aggressor head are not necessarily aligned with the servo wedges associated with the victim head as shown in FIG. 4. However, the embodiments described herein are equally advantageous when applied in such instances.

As noted above, when added to a victim microactuator command, a victim feedforward signal that is based on an aggressor VCM command can compensate for disturbances of the victim head caused by assertion of the aggressor VCM command. For example, disturbances to the victim head caused by assertion of a particular aggressor VCM command after the aggressor head passes over servo wedge N can be prevented by adding a suitable victim feedforward signal to the victim microactuator command that is asserted by the victim microactuator after the victim head passes over servo wedge N. Because the victim feedforward signal for servo wedge N is determined based on the most recent aggressor VCM commands (including the specific aggressor VCM command determined at servo wedge N), operations 420 (for positioning the victim actuator) include at least one operation that differs from the corresponding operations 410 (for positioning the aggressor actuator): next victim microactuator command calculation 425.

Next victim microactuator command calculation 425 generates an output based at least in part on a victim feedforward signal is that is determined based on the most recent aggressor VCM commands, including the next aggressor VCM command. As noted above, the next aggressor VCM command is determined in next aggressor VCM command calculation 413 and received by the servo system for positioning the victim actuator during aggressor command transmission 414. Thus, next victim microactuator command calculation 425 begins after completion of aggressor command transmission 414, at time T8 or later, so that the next victim microactuator command can include the victim feedforward signal based in part on the next aggressor VCM command. However, as shown in FIG. 4, by delaying the start of next victim microactuator command calculation 425 until time T8 or later, victim actuator command assertion 426 may not be completed until after target time T12, as described below.

During victim actuator command assertion 426, the next victim VCM command to be asserted is asserted by the victim VCM and the next victim microactuator command to be asserted is asserted by the victim microactuator. Generally, victim actuator command assertion 426 cannot begin until after completion of next victim microactuator command calculation 425, for example at time T13. In alternative embodiments, the next victim VCM command to be asserted and the next victim microactuator command to be asserted are not asserted concurrently in victim actuator command assertion 426 as shown in FIG. 4. In such embodiments, the next victim VCM command to be asserted is asserted by the victim VCM upon completion of next victim VCM command calculation 423, and the next victim microactuator command to be asserted is asserted by the victim microactuator upon completion of next victim microactuator command calculation 425. However, in such embodiments, the next victim microactuator command calculation 425 cannot begin until after completion of aggressor command transmission 414, at time T8 or later, so that the next victim microactuator command includes the victim feedforward signal that is based in part on the next aggressor VCM command.

In light of the above, there is limited time for determining and asserting a suitable victim feedforward signal during next victim microactuator command calculation 425. That is, the victim feedforward signal must be determined and added to the next victim microactuator signal between the time the aggressor VCM command is received, i.e., time T8, and the time that the next victim microactuator signal must be asserted, i.e., T12. Thus, when aggressor VCM command transmission 414 is of sufficient duration that time T8 occurs too close to time T12, or the duration of next victim microactuator command calculation 425 is of sufficient duration to extend past time T12, the servo system for positioning the victim actuator has insufficient time during next victim microactuator command calculation 425 to include a victim feedforward signal that is based on the next aggressor VCM command (determined during next aggressor VCM command calculation 413) in the calculation of the next victim microactuator command. As a result, disturbances to victim head position caused by the aggressor VCM command are not compensated for between servo wedges N and N+1. Further, in some instances, the victim feedforward signal for assertion after servo wedge N may instead be applied to the victim microactuator command asserted immediately after servo wedge N+1, which can potentially cause servo control problems.

According to various embodiments, each feedforward signal that compensates for a particular aggressor VCM control signal is determined based on the aggressor VCM control signal, stored, and asserted via the victim microactuator at a predetermined time (e.g., a "wedge offset value") relative to when that particular aggressor VCM control signal is asserted by the aggressor actuator. In some embodiments, the predetermined time is selected so that the victim feedforward signal is asserted after the victim head has passed over a specific servo wedge. In such embodiments, the specific servo wedge is circumferentially offset from the servo wedge that is 1) passed over by the aggressor head and 2) provides the PES for generating the particular VCM control signal on which the victim feedforward signal is based. That is, the particular VCM control signal is determined based on a PES generated when the aggressor head passes over a first servo wedge, the victim feedforward signal is determined based on recent aggressor VCM control signals, up to and possibly including the particular VCM control signal, and the victim feedforward signal is asserted after the victim head has passed over a second servo wedge that is circumferentially offset from the first servo wedge by a wedge offset value. For example, the particular VCM control signal can be determined based on a PES generated when the aggressor head passes over servo wedge N, while the victim feedforward signal is asserted after the victim head has passed over servo wedge N+1, or, alternatively, some other subsequent servo wedge. One such embodiment is illustrated in FIG. 5.

Figure 5:
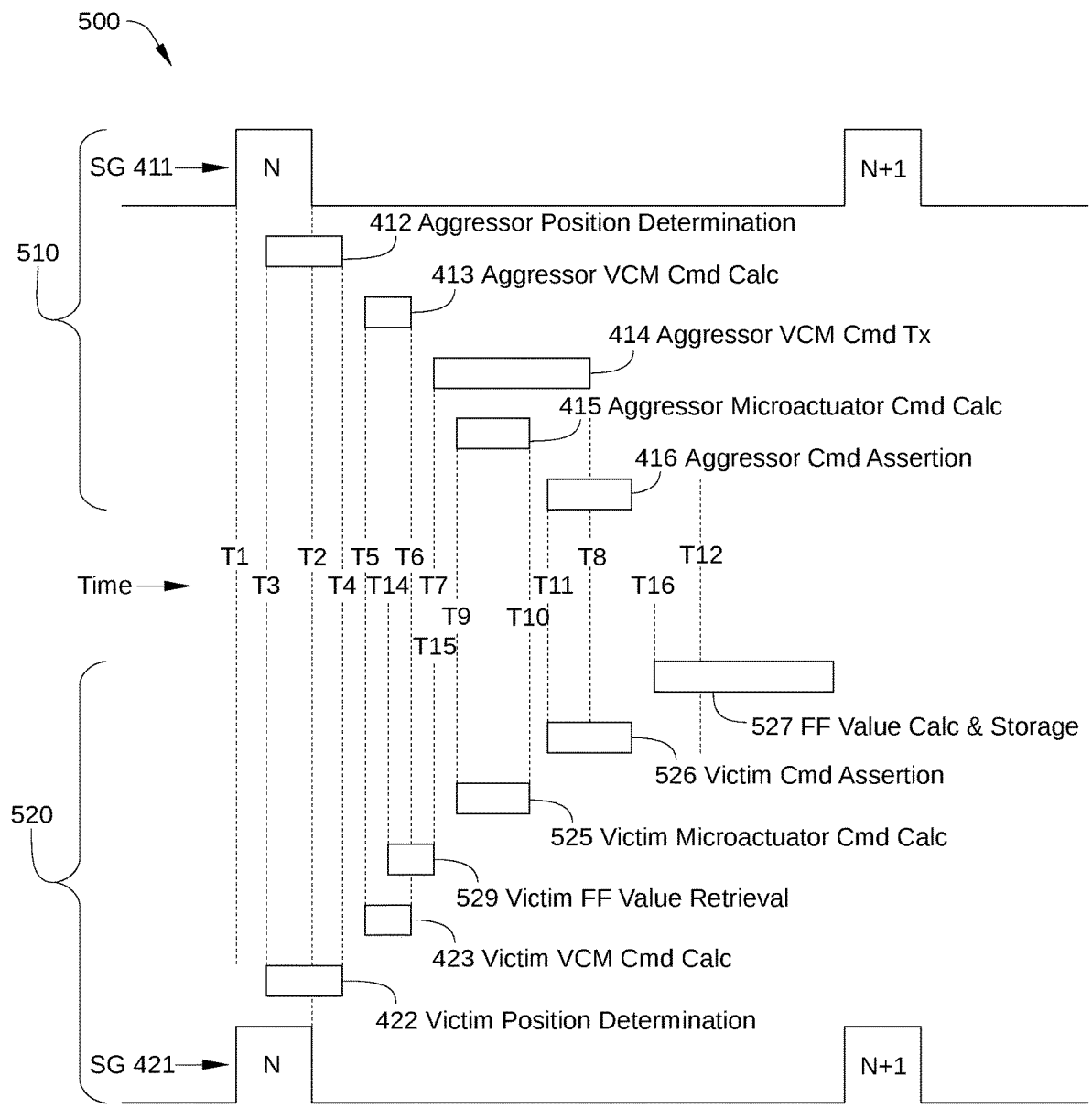
FIG. 5 is a timing diagram illustrating determination and assertion of a victim feedforward signal in the hard disk drive of FIG. 1, according to an embodiment.

FIG. 5 is a timing diagram 500 illustrating determination and assertion of a victim feedforward signal in HDD 100, according to an embodiment. Timing diagram 500 depicts the relative timing of various operations 510 performed by an aggressor servo system for positioning an aggressor actuator (e.g., VCM 128A and a suitable microactuator 229 and/or 228) and various operations 520 performed by a victim servo system for positioning a victim actuator (e.g., VCM 128B and a suitable microactuator 229 and/or 228). Operations 510 are the same as those described above for operations 410 and include opening and closing of aggressor servo gate 411, aggressor head current position determination 412, next aggressor VCM command calculation 413, aggressor VCM command transmission 414, next aggressor microactuator command calculation 415, and aggressor actuator command assertion 416. Operations 520 include certain operations that are the same as those described above for operations 420, and accordingly have the same labels as the corresponding operations in FIG. 4. In addition, operations 520 include certain additional operations that are different from those described above for operations 420. In the embodiment illustrated in FIG. 5, operations 520 include opening and closing of victim servo gate 421, victim head current position determination 422, next victim VCM command calculation 423, a victim feedforward value retrieval operation 529, a next victim microactuator command calculation 525, a victim actuator command assertion 526, and a feedforward value calculation and storing operation 527.

In victim feedforward value retrieval operation 529, the servo system for positioning the victim head, or logic communicatively coupled thereto, retrieves a value for a feedforward signal to be applied to or included in the microactuator command for servo wedge N. In general, victim feedforward value retrieval operation 529 takes place prior to next victim microactuator command calculation 525. In the embodiment illustrated in FIG. 5, victim feedforward value retrieval operation 529 occurs during next victim VCM command calculation 423, in which the VCM command to be asserted in response to the victim head passing over servo wedge N is calculated. Thus, victim feedforward command retrieval operation 529 is shown beginning at a time T14 and ending at a time T15, where time T15 occurs prior to the initiation of next victim microactuator command calculation 525 at time T9. In other embodiments, victim feedforward value retrieval operation 529 is completed at any suitable time prior to the initiation of next victim microactuator command calculation 525 at time T9. For example, in such embodiments, victim feedforward value retrieval operation 529 can occur during or before the opening and closing of victim servo gate 421 or during or before victim head current position determination 422. In one such embodiment, victim feedforward value retrieval operation 529 is completed immediately after the feedforward value calculation and storing operation 527 of the preceding servo wedge (i.e., servo wedge N−1, which is not shown in FIG. 5).

In victim feedforward value retrieval operation 529, the value for the feedforward signal to be applied to the microactuator command for servo wedge N is retrieved from a memory or other quickly accessible storage included in electronic circuits 130 of HDD 100. For example, in some embodiments, the quickly accessible storage includes a static random-access memory (SRAM) configured as a data buffer, such as a first-in, first-out (FIFO) data structure or a circular buffer. The configuration and operation of various embodiments of such quickly accessible storage are described below in conjunction with FIGS. 7 and 8. In some embodiments, the feedforward value retrieved from such a memory in victim feedforward value retrieval operation 529 is calculated prior to the victim head passing over the servo wedge associated with the victim feedforward value retrieval operation 529. Thus, in the embodiment illustrated in FIG. 5, the servo wedge associated with victim feedforward value retrieval operation 529 is servo wedge N, and the feedforward value retrieved in victim feedforward value retrieval operation 529 is calculated prior to the victim head passing over servo wedge N. For example, in one such embodiment, the value is calculated in the feedforward value calculation and storing operation 527 of a preceding servo wedge (e.g., servo wedge N−1, N−2, etc.).

Next victim microactuator command calculation 525 is performed after receiving the value for the feedforward signal to be applied to the microactuator command for servo wedge N and prior to victim actuator command assertion 526. In the embodiment illustrated in FIG. 5, next victim microactuator command calculation 525 is illustrated occurring simultaneously or concurrently with next aggressor microactuator command calculation 415. Thus, in the embodiment, next victim microactuator command calculation 525 begins at approximately time T9 and ends at time T10. During next victim microactuator command calculation 525, the next microactuator command to be asserted by the victim actuator is determined based on various factors, including the current PES for the victim head, the target position of the victim head, the target velocity profile for the victim head, and the like. In addition, the feedforward value retrieved during victim feedforward value retrieval operation 529 is added to the next victim microactuator command. Thus, the effects of the aggressor VCM commands that have been asserted in response to the aggressor head passing over preceding servo wedges (e.g., servo wedge N−1, N−2, etc.) are at least partially compensated for by modifying the victim microactuator command asserted between the current servo wedge (e.g., servo wedge N) and the next servo wedge that the victim head will pass over (e.g., servo wedge N+1).

In the embodiment illustrated in FIG. 5, next victim microactuator command calculation 525 is illustrated occurring after next victim VCM command 423. Alternatively, in some embodiments, next victim microactuator command calculation 525 may occur before or in parallel with next victim VCM command calculation 423, and may be completed before aggressor VCM command transmission 414 begins.

Victim actuator command assertion 526 is generally performed after the completion of next victim microactuator command calculation 525. In the embodiment illustrated in FIG. 5, victim actuator command assertion 526 is illustrated occurring simultaneously or concurrently with aggressor microactuator command assertion 416, but can occur independently of aggressor microactuator command assertion 416. In the embodiment shown, victim actuator command assertion 526 begins at approximately time T11, which is a point in time after the completion of next victim microactuator command calculation 525. During victim actuator command assertion 526, the next victim VCM command to be asserted is applied to the victim VCM and the next victim microactuator command to be asserted is applied to the victim microactuator. In some embodiments, victim actuator command assertion 526 occurs no later than a target time T12 to ensure that the position of the victim head is modified in a timely fashion, for example, prior to passing over the next wedge (in this case wedge N+1).

Feedforward value calculation and storing operation 527 is generally performed at some point in time after the completion of aggressor VCM command transmission 414, for example at time T16. Further, the victim feedforward value is calculated based on the most recent aggressor VCM commands that have been applied to the aggressor actuator. Various embodiments for calculating the victim feedforward value in feedforward value calculation and storing operation 527 are described below in conjunction with FIGS. 11 and 14.

For ease of description, in the embodiment illustrated in FIG. 5, each servo wedge associated with the aggressor actuator is shown to have an index value (e.g., N, N+1, etc.) that is equal to the index value of the closest corresponding servo wedge associated with the victim actuator. For example, servo wedge N associated with the aggressor actuator is disposed proximate servo wedge N associated with the victim actuator. In practice, the index values of the servo wedges on different recording surfaces of HDD 100 are not necessarily aligned in this way.

Figure 6:
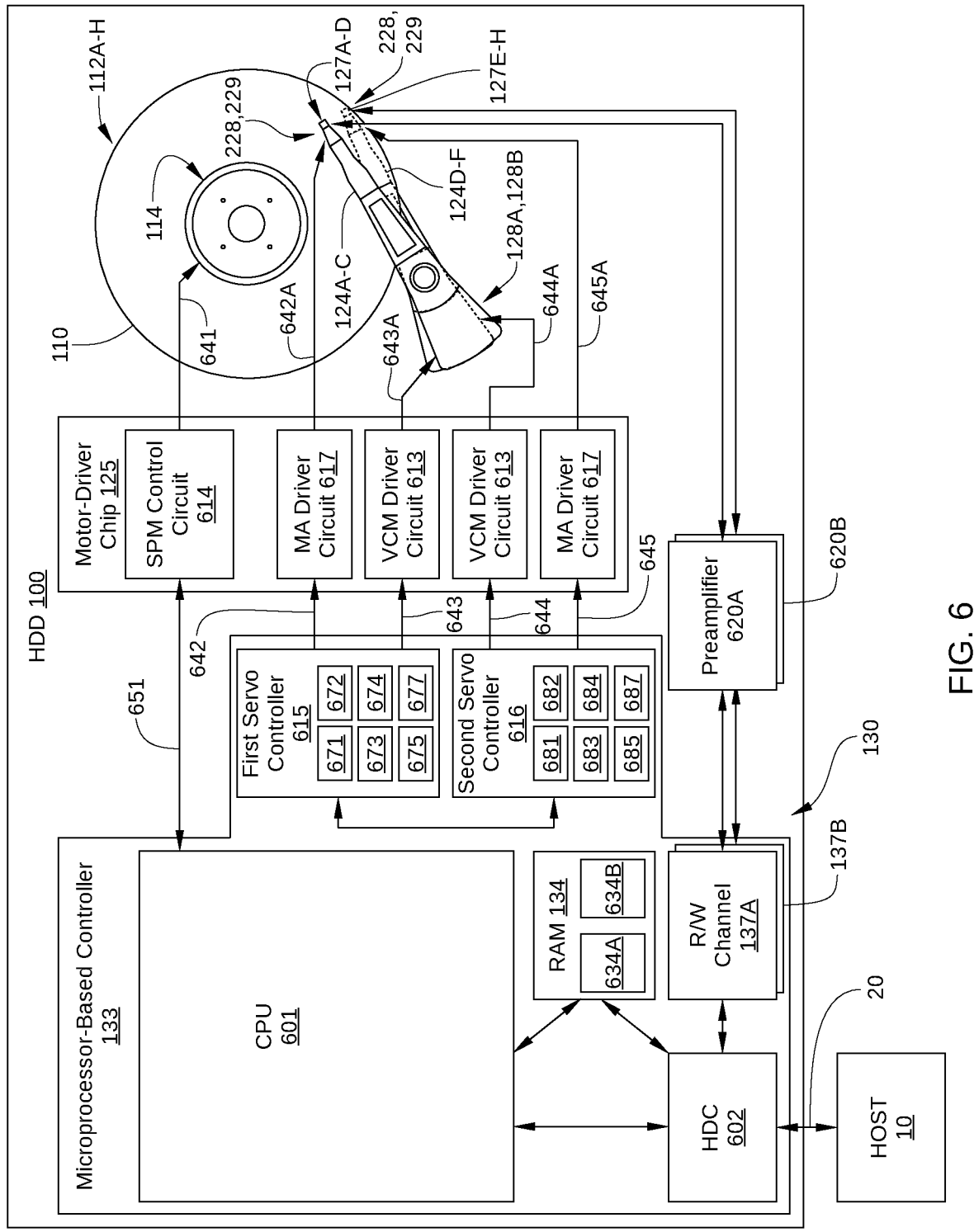
FIG. 6 illustrates an operational diagram of the HDD of FIG. 1, with some elements of electronic circuits and a motor-driver chip shown configured according to one embodiment.

FIG. 6 illustrates an operational diagram of HDD 100, with some elements of electronic circuits 130 and motor-driver chip 125 shown configured according to one embodiment. HDD 100 is connected to a host 10, such as a host computer, via a host interface 20, such as a serial advanced technology attachment (SATA) bus or a Serial Attached Small Computer System Interface (SAS) bus. As shown, microprocessor-based controller 133 includes one or more central processing units (CPU) 601 or other processors, a first servo controller 615, a second servo controller 616, a hard disk controller (HDC) 602, a DRAM 134, and read/write channels 137A and 137B. Motor-driver chip 125 includes VCM driver circuits 613, MA driver circuits 617, and a spindle motor (SPM) control circuit 614. DRAM 134 may be integrated on the same die as the controller 133, included in a separate die in the same package as the controller 133, or included in a separate package mounted on circuit board 130.

HDD 100 further includes preamplifiers 620A and 620B, which can be each mounted on actuator arm assemblies 120A and 120B or elsewhere within the head and disk assembly (HDA) of HDD 100. Preamplifier 620A supplies a write signal (e.g., current) to read/write head 127A in response to write data input from read/write channel 137A. Similarly, preamplifier 620B supplies a write signal (e.g., current) to read/write head 127B in response to write data input from read/write channel 137B. In addition, preamplifier 620A amplifies a read signal output from to read/write head 127A and transmits the amplified read signal to read/write channel 137A, and preamplifier 620B amplifies a read signal output from to read/write head 127B and transmits the amplified read signal to read/write channel 137B.

CPU 601 controls HDD 100, for example according to firmware stored in flash memory device 135 or another nonvolatile memory, such as portions of recording surfaces 112A-112H. For example, CPU 601 manages various processes performed by HDC 602, read/write channels 137A and 137B, read/write heads 127A-127H, recording surfaces 112A-112H, and/or motor-driver chip 125. Such processes include a writing process for writing data onto recording surfaces 112A-112H and a reading process for reading data from recording surfaces 112A-112H.

In some embodiments, the first servo system of HDD 100 (e.g., CPU 601, read/write channel 137A, preamplifier 620A, first servo controller 615, voice-coil motor 128A, and a suitable microactuator 228 or 229) performs positioning of a read/write head 127 included in actuator arm assembly 120A (e.g., read/write head 127A) over a corresponding recording surface (e.g., recording surface 112A), during which CPU 601 determines an appropriate current to drive through the voice coil of VCM 128A. Typically, the appropriate current is determined based in part on a position feedback signal of the read/write head, i.e., a position error signal (PES). Similarly, the second servo system of HDD 100 (e.g., CPU 601, read/write channel 137B, preamplifier 620B, second servo controller 616, voice-coil motor 128B, and a suitable microactuator 228 or 229) performs positioning of a read/write head 127 included in actuator arm assembly 120B (e.g., read/write head 127D) over a corresponding recording surface (e.g., recording surface 112D), during which CPU 601 determines an appropriate current to drive through the voice coil of VCM 128B. Although a single CPU 601 is shown here, it is possible that multiple CPUs might be used (for example, one or more CPUs for each actuator).

In the embodiment illustrated in FIG. 6, various links are shown between certain elements of HDD 100 for enablement of certain embodiments. In some embodiments, additional and/or alternative links between certain elements of HDD 100 may exist for operation of HDD 100, but are not shown for clarity and ease of description. Such additional and/or alternative links would be known to one of ordinary skill in the art.

In the embodiment illustrated in FIG. 6, microprocessor-based controller 133 includes a single CPU 601 incorporated into a single SoC 131. In alternative embodiments, microprocessor-based controller 133 includes more than one CPU. In such embodiments, HDD 100 can include two CPUs; one devoted to servo/spindle control and the other devoted to a combination of host-based and disk-control activities. In other alternate embodiments, HDD 100 can include a CPU and one or more separate servo controllers, such as first servo controller 615 and second servo controller 616 shown in FIG. 6. Alternatively or additionally, in some embodiments, HDD 100 includes a separate SoC for each actuator, where each SoC has two such CPUs. Further, in some embodiments, microprocessor-based controller 133 includes multiple motor driver chips. For instance, in one such embodiment, a first motor driver chip is dedicated for controlling the spindle motor, a first actuator, and a first microactuator, while a second motor driver chip is dedicated for controlling a second actuator and a second microactuator.

Read/write channels 137A and 137B are signal processing circuits that encode write data input from HDC 602 and output the encoded write data to respective preamplifiers 620A and 620B. Read/write channels 137A and 137B also decode read signals transmitted from respective preamplifiers 620A and 620B into read data that are outputted to HDC 602. In some embodiments, read/write channels 137A and 137B each include a single read channel and a single write channel, whereas in other embodiments, read/write channels 137A and 137B each include multiple write channels and/or multiple read channels for read/write heads 127A-127H. HDC 602 controls access to DRAM 134 by CPU 601, read/write channels 137A and 137B, and host 10, and receives/transmits data from/to host 10 via interface 20. In some embodiments, the components of microprocessor-based controller 133 (e.g., CPU 601, HDC 602, DRAM 134, and read/write channels 137A, 137B) are implemented as a one-chip integrated circuit (i.e., as an SoC). Alternatively, one or more of CPU 601, HDC 602, DRAM 134, and read/write channels 137A and 137B can each be implemented as a separate chip.

Motor-driver chip 125 drives the spindle motor 114, a first actuator (that includes VCM 128A, actuator arms 124A-124C, and bearing assembly 126), and a second actuator (that includes VCM 128B, actuator arms 124D-124F, and bearing assembly 126). A first VCM driver circuit 613 of motor-driver chip 125 generates an amplified control signal 643A in response to control signals 643 from first servo controller 615, and a second VCM driver circuit 613 of motor-driver chip 125 generates an amplified control signal 644A in response to control signals 644 from second servo controller 616. Control signals 643 enable execution of disk access commands received from host 10 that are to be executed by a first servo system of HDD 100 that includes VCM 128A and control signals 644 enable execution of disk access commands received from host 10 that are to be executed by a second servo system of HDD 100 that includes VCM 128B. MA driver circuits 617 (in some embodiments included in motor-driver chip 125) generate amplified second-stage control signals 642A and 645A in response to control signals 642 and 645 (which are control values for microactuators 228 and/or microactuators 229), respectively. Control signals 642 and 645 are generated by first servo controller 615 and second servo controller 616, respectively. Thus, a first MA driver circuit 617 generates amplified second-stage control signal 642A for microactuators 228 and/or 229 associated with actuator arm assembly 120A, and a second MA driver circuit 617 generates amplified second-stage control signal 645A for microactuators 228 and/or 229 associated with actuator arm assembly 120B.

SPM control circuit 614 generates a drive signal 641 (a drive voltage or a drive current) in response to a control signal 651 received from the CPU 601 and feedback from the spindle motor 114, and supplies drive signal 641 to spindle motor 114. In this way, spindle motor 114 rotates storage disks 110A-110D.

First servo controller 615 generates a VCM control signal 643 (drive voltage or drive current) and a microactuator control signal 642 (drive voltage or drive current). First servo controller 615 supplies VCM control signal 643 to the first actuator (VCM 128A) via a VCM driver circuit 613 and microactuator control signal 642 to a suitable microactuator 228 or 229 via one of MA driver circuits 317. In this way, first servo controller 615 positions read/write heads 127A-127D radially relative to a corresponding one of recording surfaces 112A-112D. In some embodiments, first servo controller 615 includes a fine servo controller 671 that generates microactuator control signal 642, a coarse servo controller 672 that generates VCM control signal 643, and a feedforward signal generator 673 that generates a feedforward signal (not shown in FIG. 6) for modifying microactuator control signal 642 when VCM 128A is the victim actuator.

The functionality of feedforward signal generator 673 can be implemented in whole or in part as software- or firmware-implemented logic, and/or as hardware-implemented logic circuits. Further, in some embodiments, the functionality of feedforward signal generator 673 is distributed across multiple software- firmware- and/or hardware-entities. For example, in one such embodiment, a first portion of the functionality of feedforward signal generator 673 is implemented as one or more logic circuits, such as a multiply-accumulate engine, and a second portion of the functionality of feedforward signal generator 673 is implemented as software executed by, for example, CPU 601. In such an embodiment, the multiply-accumulate engine executes most of the operations associated with performing a convolution of previously asserted VCM commands to pre-compute a partial victim feedforward value, while the software executed by the CPU uses the pre-computed partial victim feedforward value and more recently asserted VCM commands to compute a victim feedforward value for modifying microactuator control signal 642 when VCM 128A is the victim actuator.

According to various embodiments, first servo controller 615 further includes an aggressor VCM command buffer 674, a victim feedforward value buffer 675, and a recent aggressor VCM command buffer 677. As set forth below, aggressor VCM command buffer 674, victim feedforward value buffer 675, and recent aggressor VCM command buffer 677 facilitate the calculation and assertion of a victim feedforward signal by feedforward signal generator 673. In some embodiments, aggressor VCM command buffer 674, victim feedforward value buffer 675, and/or recent aggressor VCM command buffer 677 are implemented as a first-in-first-out (FIFO) memory device, a circular buffer, or any other suitable memory device that can be accessed with sufficient speed to enable embodiments described herein.

Aggressor VCM command buffer 674 is configured for storing recently asserted VCM commands issued to the aggressor actuator. Aggressor VCM command buffer 674 is configured to store a sufficient number of previously issued VCM commands to include aggressor VCM commands that can still have a significant effect on the current position of the victim head. For example, when the victim head has passed over servo wedge N, an aggressor VCM command asserted for the aggressor actuator at servo wedge N−500 is unlikely to still have a significant effect on the position of the victim head, and can generally be ignored when calculating a feedforward signal to compensate for recent motion of the aggressor actuator. By contrast, an aggressor VCM command asserted for the aggressor actuator at servo wedge N−3 is likely to have a large effect on the position of the victim head, since the mechanical disturbance of such recent motion by the aggressor actuator is still propagating throughout HDD 100. Thus, aggressor VCM command buffer 674 can be configured to store a relatively large number of aggressor VCM commands. In some embodiments, aggressor VCM command buffer 674 is configured to store a number of aggressor VCM commands that is fewer than the number of servo wedges associated with a complete rotation of a storage disk 110. For example, in some embodiments, aggressor VCM command buffer 674 is configured to store on the order of about 100 to 200 VCM commands issued most recently to the aggressor actuator. One embodiment of aggressor VCM command buffer 674 is described below in conjunction with FIG. 7A and one embodiment of recent aggressor VCM command buffer 677 is described below in conjunction with FIG. 7B.

FIG. 7A schematically illustrates an aggressor VCM command buffer 674, according to an embodiment. As shown, aggressor VCM command buffer 674 includes a plurality of VCM command entries 701 that are each associated with a corresponding servo wedge number 702. The servo wedge number 702 for a particular VCM command entry 701 indicates the servo wedge number most recently passed over by the aggressor head when the particular VCM command entry 701 is determined for the aggressor VCM. For example, when the aggressor head passes over servo wedge N and next aggressor VCM command calculation 413 is performed as shown in FIG. 5, the aggressor VCM command is calculated, asserted by the aggressor VCM (for example by the aggressor actuator), and stored in aggressor VCM command buffer 674 as one of VCM command entries 701. In addition, a unique value indicating servo wedge N, such as a wedge index value, is stored as the corresponding servo wedge number 702 for that VCM command entry 701.

In the embodiment illustrated in FIG. 7A, servo wedge numbers 702 are stored in aggressor VCM command buffer 674. In other embodiments, the association between VCM command entries 701 and servo wedge numbers 702 can be tracked using any other technically feasible approach. For instance, in some embodiments, aggressor VCM command buffer 674 does not store servo wedge numbers 702. In such embodiments, when command entries 701 are employed to determine a victim feedforward value, selection of each command entry 701 can be controlled, for example via a pointer, so that each command entry 701 is associated with the correct servo wedge during the victim feedforward calculation without explicitly retrieving a servo wedge number 702 from aggressor VCM command buffer 674.

In the embodiment illustrated in FIG. 7A, VCM command entries 701 are depicted as integer values, such as values sent to a digital-to-analog converter that is an input to a VCM driver 613. In some embodiments, such integer values may be appropriately re-scaled prior to being sent to the VCM driver 613. Alternatively, in some embodiments, each VCM command entry 701 includes a number representing a target current (e.g., in milliamperes), a target aggressor head acceleration (e.g., in m/sec$^2$), or the like.

The location of aggressor VCM command buffer 674 is depicted in FIG. 6 to be included in or otherwise associated with the servo controller of the aggressor actuator. That is, when VCM 128A is the aggressor actuator, aggressor VCM command buffer 674 of first servo controller 615 stores VCM commands for VCM 128A because first servo controller 615 controls the aggressor actuator (VCM 128A). In alternative embodiments, a VCM command buffer is instead included in or otherwise associated with the servo controller of the victim actuator. For example, in such embodiments, when VCM 128A is the aggressor actuator and VCM 128B is the victim actuator, an aggressor VCM command buffer 684 of second servo controller 616 stores the VCM commands for VCM 128A, because second servo controller 616 controls the victim actuator (VCM 128B).

Recent aggressor VCM command buffer 677 facilitates generation of a victim feedforward value for modifying microactuator control signal 642 when VCM 128A is the victim actuator. Specifically, in some embodiments, recent aggressor VCM command buffer 677 stores the aggressor VCM commands that have been most recently asserted by the aggressor VCM (VCM 128B). Some or all of the aggressor VCM commands stored by recent aggressor VCM command buffer 677 are employed in performing a convolution of previously asserted VCM commands to pre-compute a partial victim feedforward value. In such embodiments, a multiply-accumulate engine (or another logical circuit) associated with or included in feedforward signal generator 673 pre-computes a partial victim feedforward value by executing most of the operations associated with performing the convolution of previously asserted aggressor VCM commands that are likely to affect the position of the victim head, for example 100 or 200 recent aggressor VCM commands stored in aggressor VCM command buffer 674. Then, software executed by a CPU or other processor uses the pre-computed partial victim feedforward value and one, some, or all of the aggressor VCM commands stored in recent aggressor VCM command buffer 677 to complete computation of a victim feedforward value for modifying microactuator control signal 642 when VCM 128A is the victim actuator.

FIG. 7B schematically illustrates an aggressor VCM command buffer 674, according to another embodiment. Similar to the embodiment illustrated in FIG. 7A, aggressor VCM command buffer 674 includes a plurality of VCM command entries 701. Unlike the afore-mentioned embodiment, in the embodiment illustrated in FIG. 7B, aggressor VCM command buffer 674 includes two VCM commands per servo wedge. In the embodiment, aggressor VCM command buffer 674 is configured for a multi-rate control system for the aggressor actuator, in which the control signals for the aggressor actuator and the victim actuator are updated at a higher rate than the rate at which the positions of the aggressor head and the victim head are determined. For example, in an embodiment, the control signal for an aggressor actuator (and the victim actuator) is updated at twice the rate at which the read/write head position for the aggressor head and the victim head actuator is measured. Thus, in such an embodiment, two aggressor VCM commands may be associated with each servo-wedge, where these two VCM commands are the VCM commands employed by the servo system for the aggressor actuator to control the aggressor actuator for the corresponding servo wedge. A scheme for implementing embodiments in a multi-rate control system is described below in conjunction with FIGS. 12 and 14.

FIG. 7C schematically illustrates recent aggressor VCM command buffer 677, according to an embodiment. As shown, recent aggressor VCM command buffer 677 includes a plurality of VCM command entries 751 and a plurality of corresponding servo wedge numbers 752. Thus, for each VCM command entry 751, there is a corresponding servo wedge number 752. Similar to servo wedge numbers 702 of aggressor VCM command buffer 674, the servo wedge number 752 for a particular VCM command entry 751 indicates the servo wedge number most recently passed over by the aggressor head when the particular VCM command entry 751 is determined for the aggressor VCM. Thus, when the aggressor head passes over servo wedge N and next aggressor VCM command calculation 413 is performed as shown in FIG. 5, the aggressor VCM command is calculated, asserted (for example by the aggressor actuator), and stored in recent aggressor VCM command buffer 677 as one of VCM command entries 751. In addition, a unique value indicating servo wedge N, such as a wedge index value, is stored as the corresponding servo wedge number 752 for that VCM command entry 751. In the embodiment illustrated in FIG. 7B, VCM command entries 751 are depicted as integer values, such as values sent to a digital-to-analog converter that is an input to a VCM driver 613. Alternatively, in some embodiments, each VCM command entry 751 includes a number representing a target current (e.g., in milliamperes), a target aggressor head acceleration (e.g., in m/sec$^2$), or the like.

According to various embodiments, recent aggressor VCM command buffer 677 is configured to store a number of VCM command entries 751 that is equal to or greater than a wedge offset value for HDD 100 (described below in conjunction with FIG. 8). For example, when the wedge offset value is five, recent aggressor VCM command buffer 677 is configured to store the five (or slightly more than five) most recently asserted aggressor VCM commands.

In the embodiment illustrated in FIG. 7C, a single VCM command entry 751 is associated with each servo wedge number 752 in recent aggressor VCM command buffer 677. Similar to aggressor VCM command buffer 674, in embodiments in which HDD 100 includes a multi-rate control system for controlling the aggressor actuator and the victim actuator, recent aggressor VCM command buffer 677 may include multiple (e.g., two) VCM command entries 751 for each servo wedge number 752 in recent aggressor VCM command buffer 677.

Returning to FIG. 6, victim feedforward value buffer 675 is configured for storing one or more values of the victim feedforward signal to be added to microactuator control signal 642 when VCM 128A is the victim actuator. One embodiment of victim feedforward value buffer 675 is described below in conjunction with FIG. 8.

FIG. 8 schematically illustrates a victim feedforward value buffer 675, according to an embodiment. As shown, victim feedforward value buffer 675 includes one or more victim feedforward entries 801 and, for each victim feedforward entry 801, a corresponding servo wedge number 802. Thus, for each victim feedforward value stored in victim feedforward value buffer 675, there is a corresponding servo wedge number 802. That is, each value of the victim feedforward signal stored in victim feedforward value buffer 675 is associated with a particular servo wedge of a recording surface. According to various embodiments, a time at which a particular victim feedforward entry 801 is employed to compensate for an aggressor actuator command can be determined based on 1) the servo wedge number 802 corresponding to that particular victim feedforward entry 801 and 2) a preset wedge offset value (described below). In some embodiments, each servo wedge number 802 in victim feedforward value buffer 675 indicates a respective servo wedge of a recording surface associated with the aggressor actuator, and in other embodiments, with a respective servo wedge of a recording surface associated with the victim actuator.

In the embodiment illustrated in FIG. 8, victim feedforward entries 801 are depicted as integer values that are re-scaled prior to being sent to the MA Driver Circuit 617 to indicate a target displacement of the microactuator (for example, in units of servo-tracks). Alternatively, in some embodiments, each victim feedforward entry 801 includes a value indicating a target voltage applied to a microactuator (e.g., microactuator 228).

In embodiments in which each servo wedge number 802 indicates a respective servo wedge of a recording surface associated with the aggressor actuator, the servo wedge number 802 indicates the servo wedge most recently passed over by the aggressor head when that particular victim feedforward value was determined. For example, when the aggressor head passes over servo wedge N in FIG. 5 and a victim feedforward entry 801 is calculated, that victim feedforward entry 801 is stored in victim feedforward value buffer 675 and the corresponding servo wedge number 802 for that victim feedforward value 801 is a unique wedge index value indicating servo wedge N.

According to such embodiments, a particular victim feedforward entry 801 is asserted at a servo wedge that does not circumferentially correspond to the servo wedge indicated by the servo wedge number 802 for that particular victim feedforward entry 801. Instead, in such embodiments, a particular victim feedforward entry 801 is asserted at a servo wedge that is circumferentially offset by a preset wedge offset value from the servo wedge indicated by the servo wedge number 802. For example, when the aggressor head passes over servo wedge N in FIG. 5, an aggressor VCM command is calculated in next aggressor VCM command calculation 413 for servo wedge N. Then, in feedforward value calculation and storing operation 527, a victim feedforward value is calculated and is stored in victim feedforward value buffer 675 as a victim feedforward entry 801, along with an associated servo wedge number 802 (such as a unique wedge index value indicating servo wedge N). In the example, that victim feedforward entry 801 is asserted in response to the victim head passing over a servo wedge on the recording surface associated with the victim actuator that is circumferentially offset from servo wedge N by the preset wedge offset value. Thus, that victim feedforward entry 801 is not asserted in response to the victim head passing over servo wedge N on the recording surface associated with the victim actuator, and instead is asserted at a later servo wedge. For example, when the wedge offset value is set to 1, that victim feedforward entry 801 is asserted in response to the victim head passing over servo wedge N+1 on the recording surface associated with the victim actuator. Similarly, when the wedge offset value is set to 2, that victim feedforward entry 801 is asserted in response to the victim head passing over servo wedge N+2 on the recording surface associated with the victim actuator. Generally, the preset wedge offset value for an HDD is an integral value from one to five.

In this way, a victim feedforward value that is calculated and stored in feedforward value calculation and storing operation 527 for servo wedge N is asserted in victim actuator command assertion 526 for a subsequent servo wedge, such as servo wedge N+1 or N+2. Thus, a victim feedforward value is generated based on position information collected when the aggressor head passes over a first servo wedge of the recording surface associated with the aggressor head, and the victim feedforward value is asserted in response to the victim head passing over a second servo wedge of the recording surface associated with the victim head, where the second servo wedge does not circumferentially correspond to the first servo wedge.

In alternative embodiments, each servo wedge number 802 stored in victim feedforward value buffer 675 indicates a respective servo wedge of a recording surface associated with the victim actuator. In one such embodiment, the servo wedge number 802 for a particular victim feedforward entry 801 indicates the servo wedge to be passed over by the victim head prior to that particular victim feedforward value being asserted. In such an embodiment, the servo wedge to be passed over by the victim head is circumferentially offset by a preset wedge offset value from an aggressor servo wedge, which is a servo wedge of the recording surface associated with the aggressor head. Specifically, in this embodiment, the aggressor servo wedge is the servo wedge from which the most recent position information was collected for the aggressor head on which an aggressor VCM control signal is based that is included in the VCM control signals used to generate the particular victim feedforward entry 801. Thus, in such an embodiment, the aggressor servo wedge is the last servo wedge of the recording surface from which aggressor head position information has been collected that is included in the calculation of the particular victim feedforward entry 801.

For example, in one such embodiment, when the victim head passes over servo wedge N in FIG. 5, a particular victim feedforward entry 801 is employed during next victim microactuator command calculation 525 for servo wedge N. That particular victim feedforward value is calculated based on a plurality of aggressor VCM commands asserted prior to the victim head passing over servo wedge N (for example when the aggressor head passes over servo wedge N−1, N−2, etc.). That is, the particular victim feedforward entry 801 is calculated based on a plurality of aggressor VCM commands, the most recent of which is generated in response to the aggressor head passing over a servo wedge that is 1) circumferentially offset by a wedge offset value from servo wedge N and 2) is passed over by the aggressor head prior to the victim head passing over servo wedge N. Thus, when the wedge offset value is set to one, the particular victim feedforward entry 801 stored in victim feedforward value buffer 675 that is associated with servo wedge N is generated based on position information that has been collected when the aggressor head passes over servo wedge N−1 and over previous servo wedges, but not on position information that has been collected when the aggressor passes over servo wedge N. Similarly, when the wedge offset value is set to two, that particular victim feedforward entry 801 stored in victim feedforward value buffer 675 is generated based on position information that has been collected when the aggressor head passes over servo wedge N−2 and a plurality of servo wedges preceding servo wedge N−2, but not on position information that has been collected when the aggressor passes over servo wedges N or N−1.

In the embodiment, the servo wedge indicated by the servo wedge number 802 for a particular victim feedforward entry 801 is a unique index value. The unique index value indicates a servo wedge passed over by the victim head (e.g., servo wedge N) that is offset by the wedge offset value (e.g., 2) from the servo wedge passed over by the aggressor head and associated with the determination of that particular victim feedforward entry 801 (e.g., servo wedge N−2). That is, in such an embodiment, the unique index value indicates the servo wedge to be passed over by the victim head immediately prior to that particular victim feedforward value being asserted. Therefore, as with the previously described embodiment for servo wedge number 802, a victim feedforward value is generated based on position information collected when the aggressor head passes over a first servo wedge of the recording surface associated with the aggressor head, and the victim feedforward value is asserted in response to the victim head passing over a second servo wedge of the recording surface associated with the victim head, where the second servo wedge does not circumferentially correspond to the first servo wedge and is circumferentially offset from the first servo by the wedge offset value.

In the embodiment illustrated in FIG. 8, victim feedforward value buffer 675 includes 11 or more victim feedforward entries 801 and corresponding servo wedge numbers 802. In other embodiments, victim feedforward value buffer 675 includes a number of victim feedforward entries 801 and servo wedge numbers 802 equal to or slightly greater than the above-described wedge offset value.

Returning to FIG. 6, second servo controller 616 is similar in configuration and operation to first servo controller 615. Second servo controller 616 generates a VCM control signal 644 (drive voltage or drive current) and a microactuator control signal 645 (drive voltage or drive current), and supplies VCM control signal 644 to the second actuator (VCM 128B) via a VCM driver circuit 613 and microactuator control signal 645 to a suitable microactuator 228 or 229 via MA driver circuit 317. In this way, second servo controller 616 positions read/write heads 127E-127H radially with respect to a corresponding one of recording surface 112E-127H. In some embodiments, second servo controller 616 includes a fine servo controller 681 that generates microactuator control signal 645, a coarse servo controller 682 that generates VCM control signal 644 and a feedforward signal generator 683 that generates a feedforward signal (not shown in FIG. 6) for modifying microactuator control signal 645.

Similar to feedforward signal generator 673, the functionality of feedforward signal generator 683 can be implemented in whole or in part as software- or firmware-implemented logic, and/or as hardware-implemented logic circuits. Further, in some embodiments, the functionality of feedforward signal generator 673 is distributed across multiple software- firmware- and/or hardware-entities.

According to various embodiments, second servo controller 616 further includes an aggressor VCM command buffer 684, a victim feedforward value buffer 685, and a recent aggressor VCM command buffer 687. Aggressor VCM command buffer 684, victim feedforward value buffer 685, and recent aggressor VCM command buffer 687 facilitate the calculation and assertion of a victim feedforward signal by feedforward signal generator 683 in the same way (described above) that aggressor VCM command buffer 674, victim feedforward value buffer 675, and recent aggressor VCM command buffer 687 facilitate the calculation and assertion of a victim feedforward signal by feedforward signal generator 683. In some embodiments, aggressor VCM command buffer 684, victim feedforward value buffer 685, and/or recent aggressor VCM command buffer 687 are implemented as a FIFO memory device, a circular buffer, or any other suitable memory device that can be accessed with sufficient speed to enable embodiments described herein.

In the embodiment described above, first servo controller 615 and second servo controller 616 each generate a feedforward signal for modifying a microactuator signal. In alternative embodiments, CPU 601 generates a feedforward signal for modifying microactuator signal 642 and another feedforward signal for modifying microactuator signal 645. Thus, in some embodiments, first servo controller 615 and second servo controller 616 are implemented in whole or in part in firmware running on CPU 601. In embodiments in which microprocessor-based controller 133 includes multiple CPUs, such firmware can run on one or more of the multiple CPUs.

In the embodiment described above, aggressor VCM command buffer 674, victim feedforward value buffer 675, and/or recent aggressor VCM command buffer 677 are included in or otherwise associated with first servo controller 615 and aggressor VCM command buffer 684, victim feedforward value buffer 685, and/or recent aggressor VCM command buffer 687 are included in or otherwise associated with second servo controller 616. In other embodiments, the functionality of aggressor VCM command buffer 674, victim feedforward value buffer 675, recent aggressor VCM command buffer 677, aggressor VCM command buffer 684, victim feedforward value buffer 685 and/or recent aggressor VCM command buffer 677 is included in RAM 134.

Feedforward Control Signal Based on Aggressor Operation

Figure 9A:
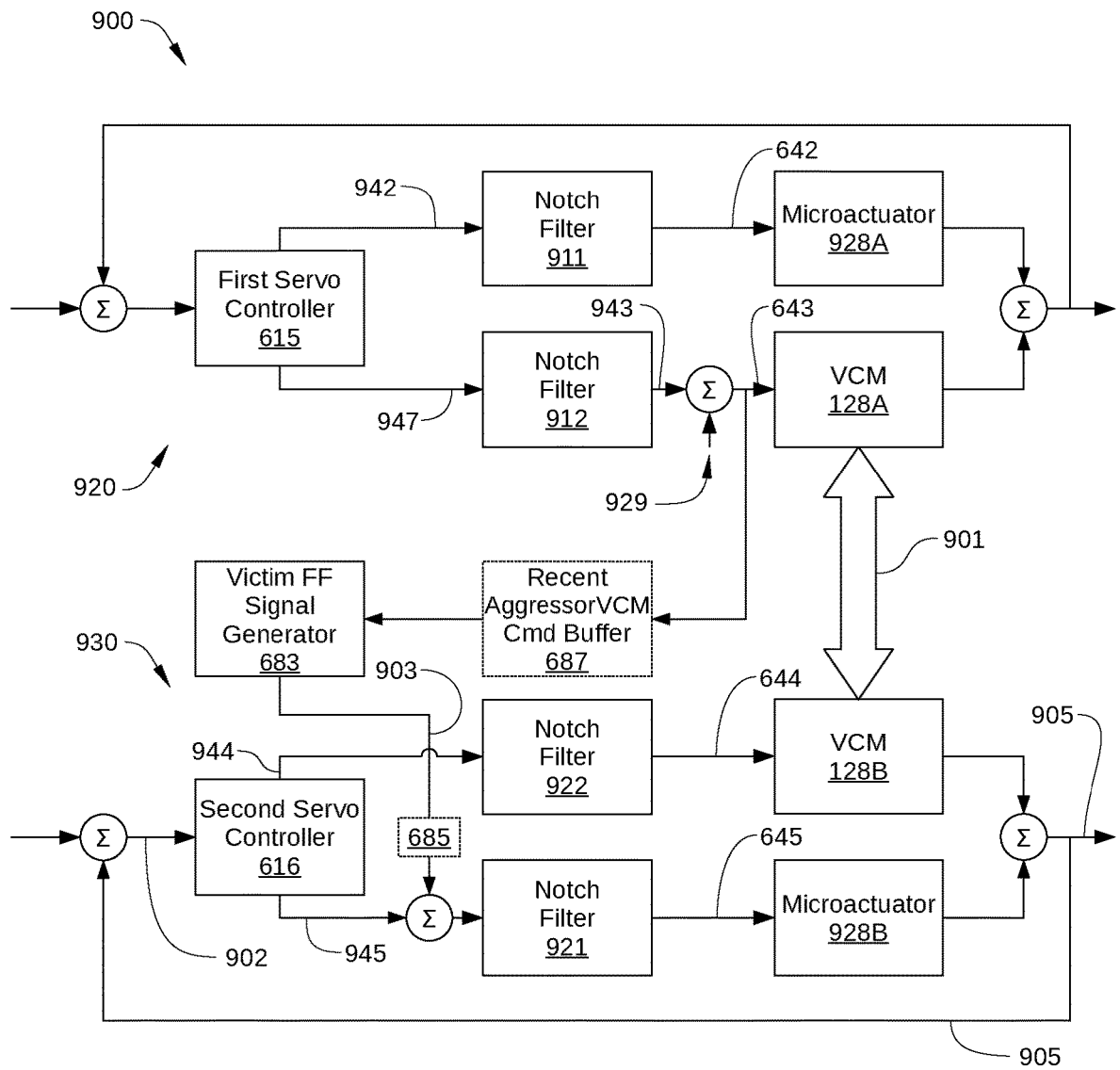
FIG. 9A is a control diagram illustrating the generation and application of a victim feedforward control signal in the hard disk drive of FIG. 1, according to various embodiments.

FIG. 9A is a control diagram 900 illustrating the generation and application of a victim feedforward control signal in HDD 100, according to various embodiments. As shown, HDD 100 includes a first control loop 920 associated with an aggressor actuator (in this example VCM 128A) and a second control loop 930 associated with a victim actuator (in this example VCM 128B).

First control loop 920 includes VCM 128A, a microactuator 928A for the currently active read/write head associated with VCM 128A, aggressor VCM command buffer 674, and first servo controller 615. In some embodiments, first control loop 920 further includes a notch filter 911 for modifying microactuator control signals 942 for microactuator 928A and/or a notch filter 912 for modifying VCM control signals 947 for VCM 128A to a filtered VCM control signal 943. In some embodiments, first control loop 920 also includes an injection point 929. Injection point 929 is a point in first control loop 920 at which a disturbance can be injected into control signals that are applied to VCM 128A (e.g., VCM control signal 643) as part of measuring a transfer function as described below in conjunction with FIG. 9.

Second control loop 930 includes VCM 128B, a microactuator 928B for the currently active head associated with VCM 128B, second servo controller 616, and feedforward signal generator 683. In some embodiments, second control loop 930 further includes recent aggressor VCM command buffer 687, and in some embodiments second control loop 930 further includes victim feedforward value buffer 675. Additionally or alternatively, in some embodiments, second control loop 930 further includes a notch filter 921 for modifying microactuator control signals 945 for microactuator 928B and/or a notch filter 922 for modifying VCM control signals 944 for VCM 128B.

Figure 9B:
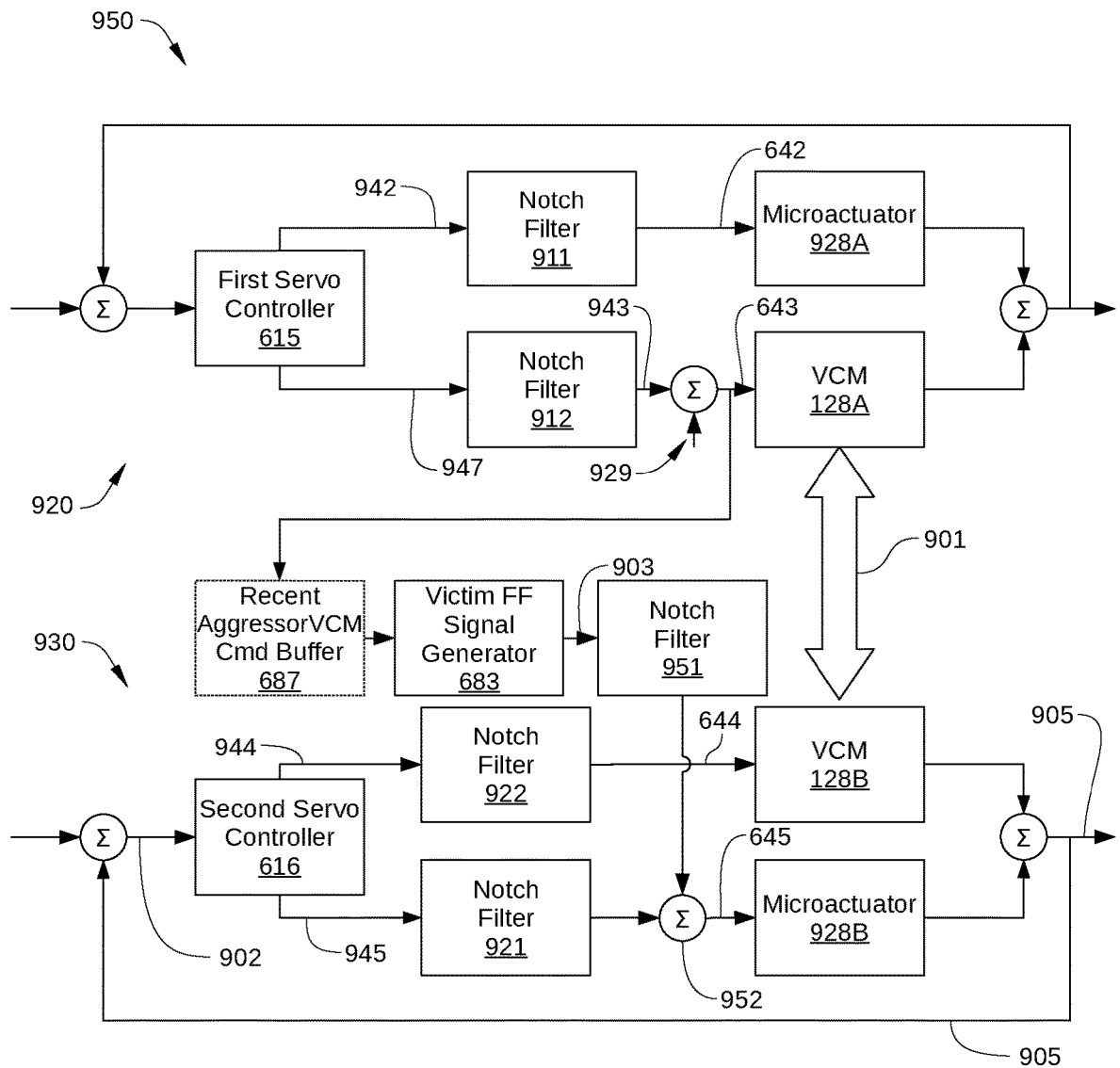
FIG. 9B is a control diagram illustrating the generation and application of a victim feedforward control signal in the hard disk drive of FIG. 1, according to various embodiments.

For clarity, VCM driver circuit 613 and MA driver circuit 617 are not shown in FIGS. 9A and 9B. Instead, the functionality of VCM driver circuit 613 is included in VCM 128A and 128B, while the functionality of MA driver circuit 617 is included in microactuator 928A and 928B. Further, in the embodiment illustrated in FIG. 9A, notch filters 911 and 912 are depicted as external to first servo controller 615 and recent aggressor VCM command buffer 687, victim feedforward signal generator 683, and notch filters 921 and 922 are depicted as external to second servo controller 616. In other embodiments, notch filters 911 and/or 912 may be implemented conceptually or physically as part of first servo controller 615, and recent aggressor VCM command buffer 687, victim feedforward signal generator 683, and/or notch filters 921 and 922 may be implemented conceptually or physically as part of second servo controller 616.

During operation, first servo controller 615 generates VCM control signal 643 (or alternatively VCM control signal 947, on which VCM control signal 643 is based) for VCM 128A and microactuator control signal 642 (or alternatively microactuator control signal 942, on which microactuator control signal 642 is based) for microactuator 928A. Alternatively, CPU 601 generates microactuator control signal 642 for microactuator 928A. Because of mechanical coupling 901 between VCM 128A and VCM 128B, operations performed by VCM 128A in response to VCM control signal 643 cause a radial displacement of the currently active read/write head associated with VCM 128B. This radial displacement contributes to position error signal (PES) 902 based on the radial position 905 of the currently active read/write head associated with VCM 128B. According to various embodiments, feedforward signal generator 683 generates a victim feedforward signal 903 based on a transfer function, where the transfer function models commands added to microactuator control signal 645 for microactuator 928B (the victim microactuator) as a function of VCM control signal 643 for VCM 128A (the aggressor actuator). Feedforward signal generator 683 in second servo controller 616 receives information about VCM control signal 947 from first servo controller 615 via a communication link between first servo controller 615 and second servo controller 616 (shown in FIG. 6). The information about VCM control signal 947 is associated with a first servo wedge. In some embodiments, feedforward signal 903 values (for example victim feedforward entries 801 and servo wedge numbers 802) are then stored in victim feedforward value buffer 685 and added to a subsequent microactuator control signal 645 associated with a second servo wedge that is passed over by the victim head subsequent to the aggressor head passing over the first servo wedge. In some embodiments, victim feedforward value buffer 685 may be included in, for example, victim feedforward signal generator 683 or in second servo controller 616. Feedforward signal 903, when added to the appropriate microactuator control signal 945 (or alternatively to microactuator control signal 645, which is based on microactuator control signal 945), reduces or compensates for contributions to radial position 905 caused when VCM control signal 643 (which is based on VCM control signal 947) is applied to VCM 128A. Victim feedforward entries 801 are employed based on the corresponding servo wedge number 801 in victim feedforward value buffer 685. As a result, the use of a particular victim feedforward entry 801 is timed to be used for an appropriate servo wedge that is crossed by the victim head (the second servo wedge) after the aggressor head has passed over a servo wedge (the first servo wedge) that is used to generate the particular victim feedforward entry 801.

Alternatively, in some embodiments, a suitable victim feedforward value is generated by victim feedforward signal generator 683 immediately before being added to the appropriate microactuator control signal 945 and storage of victim feedforward values for one or more servo wedges is not needed. For example, in such embodiments, victim feedforward value buffer 685 is not employed. Instead, a victim feedforward value used to modify microactuator control signal 945 that is asserted in victim actuator command assertion 526 of FIG. 5 for servo wedge N is calculated shortly before victim actuator command assertion 526, for example in victim microactuator command calculation 525 for servo wedge N. In such embodiments, the victim feedforward value is based on aggressor actuator commands that are associated with servo wedges prior to servo wedge N, the most recent of which precedes servo wedge N by the wedge offset value for HDD 100. In such embodiments, one or more of the most recent aggressor actuator commands that are employed to generate the victim feedforward value may be stored in recent aggressor VCM command buffer 687.

In some embodiments, the transfer function for determining feedforward signal 903, referred to herein as the feedforward transfer function, is determined as the ratio of two transfer functions that can be directly measured in the multi-actuator drive: a first transfer function modeling radial position 905 as a function of filtered VCM control signal 643 for VCM 128A and a second transfer function modeling radial position 905 as a function of commands 903 that are added to microactuator control signal 945 or microactuator control signal 645. In such embodiments, the first and second transfer functions can be determined in HDD 100 as part of a calibration/start-up process or during factory tuning of the drive. For example, in one such embodiment, values associated with the first transfer function are determined by adding various values to filtered VCM control signal 943 and measuring the resultant radial position 905 of the victim read/write head. Similarly, values associated with the second transfer function are determined by adding various values of feedforward signal 903 to microactuator control signal 645 and measuring the resultant radial position 905 of the victim read/write head. In some embodiments, the second transfer function is determined by adding various values of feedforward signals directly to microactuator control signal 645. In alternative embodiments, the second transfer function is determined by adding various values of feedforward signals to the input of notch filter 921, the output of which is microactuator control signal 645. The latter embodiment is shown in FIG. 9A. The second transfer function is determined using the same injection point that will be used to inject feedforward during operation of the HDD 100.

In some embodiments, victim feedforward signal 903 is generated using a kernel that is derived based on the feedforward transfer function. In such embodiments, values associated with the feedforward transfer function are determined by taking a ratio of the above-described first and second transfer functions (e.g., the first transfer function divided by the second transfer function), where the kernel is the inverse discrete Fourier transform (DFT) of the values associated with the feedforward transfer function. Subsequently, feedforward signal generator 683 can convolve values for filtered VCM control signal 943 with the kernel to generate feedforward signal 903.

In the embodiment illustrated in FIG. 9A, VCM 128A is described as the aggressor actuator and VCM 128B is described as the victim actuator. In other instances, VCM 128B can operate as the aggressor actuator and VCM 128A can operate as the victim actuator. In such instances, feedforward signal generator 673 (shown in FIG. 6) generates a feedforward signal similar to feedforward signal 903 and provides that feedforward signal to microactuator 928A as a correction signal. In normal practice, VCM 128A and VCM 128B act as both the aggressor actuator and the victim actuator simultaneously.

In the embodiment illustrated in FIG. 9A, feedforward signal generator 683 is implemented as an element of HDD 100 that is separate from first servo controller 615 and second servo controller 616. Alternatively, feedforward signal generator 683 is implemented as a component of first servo controller 615, a component of second servo controller 616, or a component of both first servo controller 615 and second servo controller 616. Similarly, in instances in which VCM 128B is the aggressor actuator and VCM 128A is the victim actuator, feedforward signal generator 673 can be implemented as an element of HDD 100 that is separate from first servo controller 615 and second servo controller 616, as a component of first servo controller 615, a component of second servo controller 616, or a component of both first servo controller 615 and second servo controller 616.

In embodiments in which multiple read/write heads are coupled to a victim actuator, such as VCM 128A or VCM 128B, the above-described feedforward transfer function for determining feedforward signal 903 typically varies for each such read/write head. That is, mechanical coupling 901 between an aggressor actuator and a victim actuator can result in a different contribution to radial position 905 of a victim head, depending on the victim head. For example, referencing the embodiment illustrated in FIG. 2, actuation of actuator arm assembly 120A can affect radial position 905 for each of read/write heads 227E, 227F, 227G, and 227H differently. In such embodiments, a different feedforward transfer function for determining feedforward signal 903 is determined for each read/write head 127 included in HDD 100. A process for determining different feedforward transfer functions for each read/write head 127 of HDD 100 is described below in conjunction with FIG. 6.

In some embodiments, first control loop 920 includes notch filter 911 and/or notch filter 912 and second control loop 930 includes notch filter 921 and/or notch filter 922. In such embodiments, notch filters 912 and 922 may be band-stop filters configured to block or attenuate portions of input signals that are likely to excite one or more resonances in or associated with VCM 128A and 128B, respectively. For first control loop 920, properly-designed notch filters 911 and 912, in combination with other elements in first servo controller 615 and the mechanical system including microactuator 928A and VCM 128A, can result in a stable servo control-loop. Without the notch filters, the control loop 920 might be unstable, or only marginally stable. Similarly, for second control loop 930, properly-designed notch filters 921 and 922 facilitate a stable servo control-loop. For example, one or more bands of an input signal, such as VCM control signal 642 or 644, are reduced in amplitude when processed by notch filter 912 or 922. Notch filters 911 and 921 are configured to remove or reduce portions of input signals that are likely to excite one or more resonances in or associated with microactuators 928A and 928B, respectively.

In the embodiment described above, notch filters 911, 912, 921, and 922 are employed to eliminate or greatly attenuate certain frequency components. Alternatively or additionally, in some embodiments, one or more of notch filters 911, 912, 921, and 922 are configured to modify the phase of a signal and/or to increase the gain of a signal at certain frequencies. Such filters are sometimes called "phase steering" or "loop-shaping" filters, and can be used to stabilize a system using calculations that are similar or identical to calculations included in notch filters that are designed to eliminate or greatly attenuate certain frequency components.

FIG. 9B is a control diagram 950 illustrating the generation and application of a victim feedforward control signal in HDD 100, according to various embodiments. Control diagram 950 is substantially similar to control diagram 900 in FIG. 9A, with two exceptions. First, control diagram 950 includes a notch filter 951 that is configured to process the output of victim feedforward signal generator 683 and victim feedforward value buffer 685, i.e., victim feedforward signal 903. Second, victim feedforward signal 903, after being modified by notch filter 951, is added to actuator control signal 645 in a different location, i.e., a summer 952 disposed between notch filter 921 and microactuator 928A. Implementation of various embodiments of notch filters in a servo control loop of HDD 100 are described below in conjunction with FIGS. 10A and 10B.

Figure 10A:
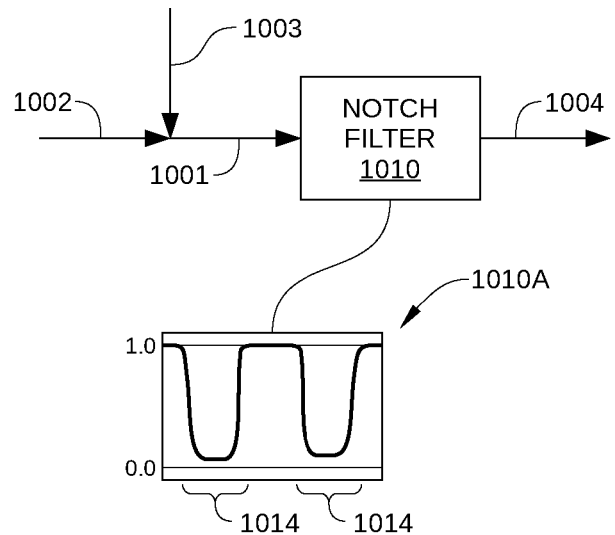
FIG. 10A schematically illustrates an implementation of a notch filter in a servo control loop of the hard disk drive of FIG. 1, according to an embodiment.

FIG. 10A schematically illustrates an implementation of a notch filter 1010 in a servo control loop of HDD 100, according to an embodiment. For example, notch filter 1010 can be implemented in first control loop 920 of FIG. 9A or 9B as notch filter 911, notch filter 912, and/or as notch filter 951. Alternatively or additionally, notch filter 1010 can be implemented in second control loop 930 of FIG. 9A or 9B as notch filter 921 and/or as notch filter 922.

As shown, notch filter 1010 receives an input signal 1001. In some embodiments, input signal 1001 can be a sum of a control signal and a correction signal. For example, in one such embodiment, input signal 1001 corresponds to the sum of microactuator control signals 945 and victim feedforward signal 903 in FIG. 9A. Notch filter 1010 is configured to reduce, block, or otherwise attenuate one or more frequency bands 1014 of input signal 1001. The above-described behavior of notch filter 1010 is indicated graphically by a transfer function 1010A and enables notch filter 1010 to generate a filtered control signal 1004. Thus, notch filter 1010 is configured to prevent or reduce loop oscillations at certain frequencies, such as those associated with resonances of microactuators 228 or 229 or VCM 128A or 128B of FIG. 2.

Figure 10B:
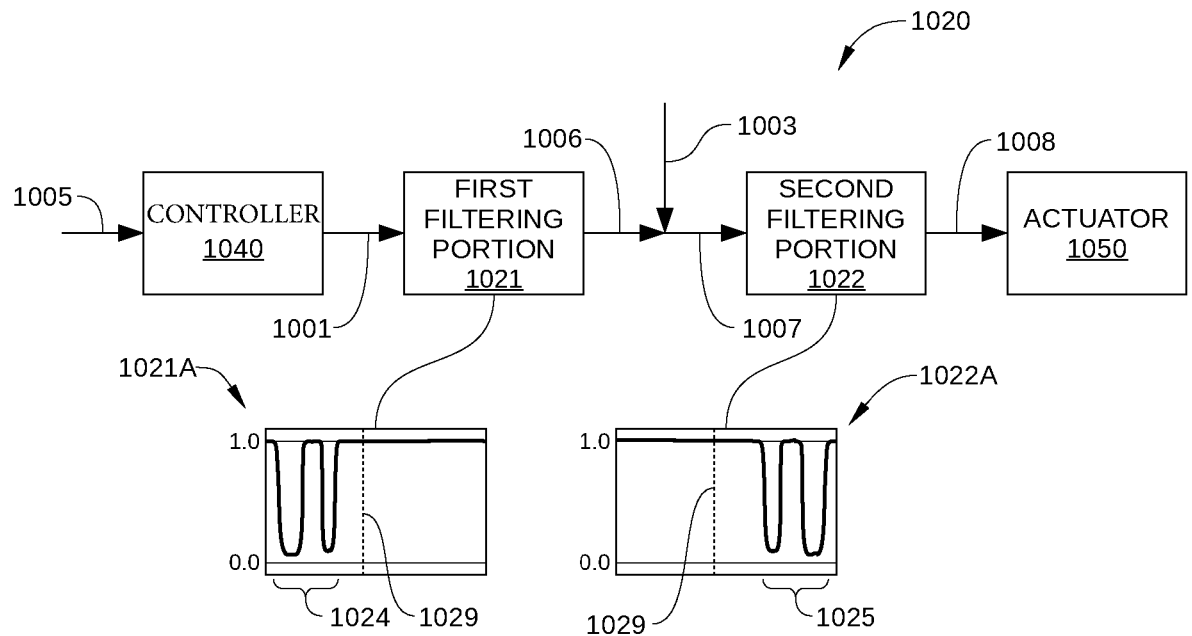
FIG. 10B schematically illustrates an implementation in a servo control loop of the hard disk drive of FIG. 1 of a notch filter that includes multiple filtering portions, according to an embodiment.

FIG. 10B schematically illustrates an implementation in a servo control loop of HDD 100 of a notch filter 1020 that includes multiple filtering portions, according to an embodiment. In some embodiments, notch filter 1020 can be employed as one or more of the notch filters of first control loop 920 and/or second control loop 930 of FIG. 9A or 9B, such as notch filters 911, 912, 921 and/or 922. In the embodiment illustrated in FIG. 10B, notch filter 1020 includes a first filtering portion 1021 and a second filtering portion 1022, where first filtering portion 1021 functions as a first notch filter and second filtering portion 1022 functions as a second notch filter in series with the first notch filter.

In the embodiment, first filtering portion 1021 is disposed in a control loop between a controller 1040 and second filtering portion 1022. For example, controller 1040 can correspond to first servo controller 615 or second servo controller 616 of FIG. 9A or 9B. Consequently, first filtering portion 1021 is configured to process or modify an input signal 1002 to generate a filtered control signal 1006. For example, input signal 1002 can be a microactuator control signal, such as microactuator control signal 942 or microactuator control signal 945 of FIG. 9A or 9B. By contrast, second filtering portion 1022 is disposed in a control loop between first filtering portion 1021 and an actuator 1050, and is configured to generate a filtered corrected control signal 1008 by processing or modifying an input signal 1007. In the embodiment illustrated in FIG. 10B, input signal 1007 is a combination of filtered control signal 1006 and a correction signal 1003. For example, correction signal 1003 can be victim feedforward signal 903 of FIG. 9A or 9B and filtered corrected control signal 1008 can be a microactuator control signal provided to a microactuator of HDD 100, such as microactuator control signal 645 for microactuator 928B in FIG. 9A or 9B.

As indicated by a transfer function 1021A, first filtering portion 1021 is configured to reduce, block, or otherwise attenuate one or more low-frequency bands 1024 of input signal 1002, where the low-frequency band or bands 1024 are below a feedforward frequency threshold 1029. The above-described behavior of first filtering portion 1021 is indicated graphically by transfer function 1021A and enables first filtering portion 1021 to generate filtered control signal 1006. Thus, first filtering portion 1021 can prevent or reduce resonant oscillations at low frequencies in a servo loop. In a similar vein, a transfer function 1022A indicates that second filtering portion 1022 is configured to reduce, block, or otherwise attenuate one or more high-frequency bands 1025 of an input signal, such as input signal 1007, and generate a filtered corrected control signal 1008 for actuator 1050. In some embodiments, actuator 1050 is one of microactuators 928A or 928B of FIG. 9A or 9B. As shown, corrected control signal 1007 is based on a combination of correction signal 1003 and filtered control signal 1006, and the high-frequency band or bands 1025 are above feedforward frequency threshold 1029.

Because some low-frequency band or bands 1024 may overlap with frequencies associated with correction signal 1003, in some embodiments first filtering portion 1021 does not receive and modify a corrected control signal that includes correction signal 1003. Instead, second filtering portion 1022 is configured to receive a signal that includes correction signal 1003, such as corrected control signal 1007. As a result, significant portions of a correction signal that are added to a microactuator control signal are less likely to be removed.

In the embodiment illustrated in FIG. 10B, first filtering portion 1021 and second filtering portion 1022 are each depicted as a single notch filter with two stop bands of low transmittance, such as low-frequency bands 1024 in first filtering portion 1021 and high-frequency bands 1025 in second filtering portion 1022. Alternatively, in some embodiments, first filtering portion 1021 includes a plurality of notch filters that each include a stop band that is less than feedforward frequency threshold 1029. Alternatively or additionally, in some embodiments, second filtering portion 1022 includes a plurality of notch filters that each include a stop band that is greater than feedforward frequency threshold 1029.

Figure 11:
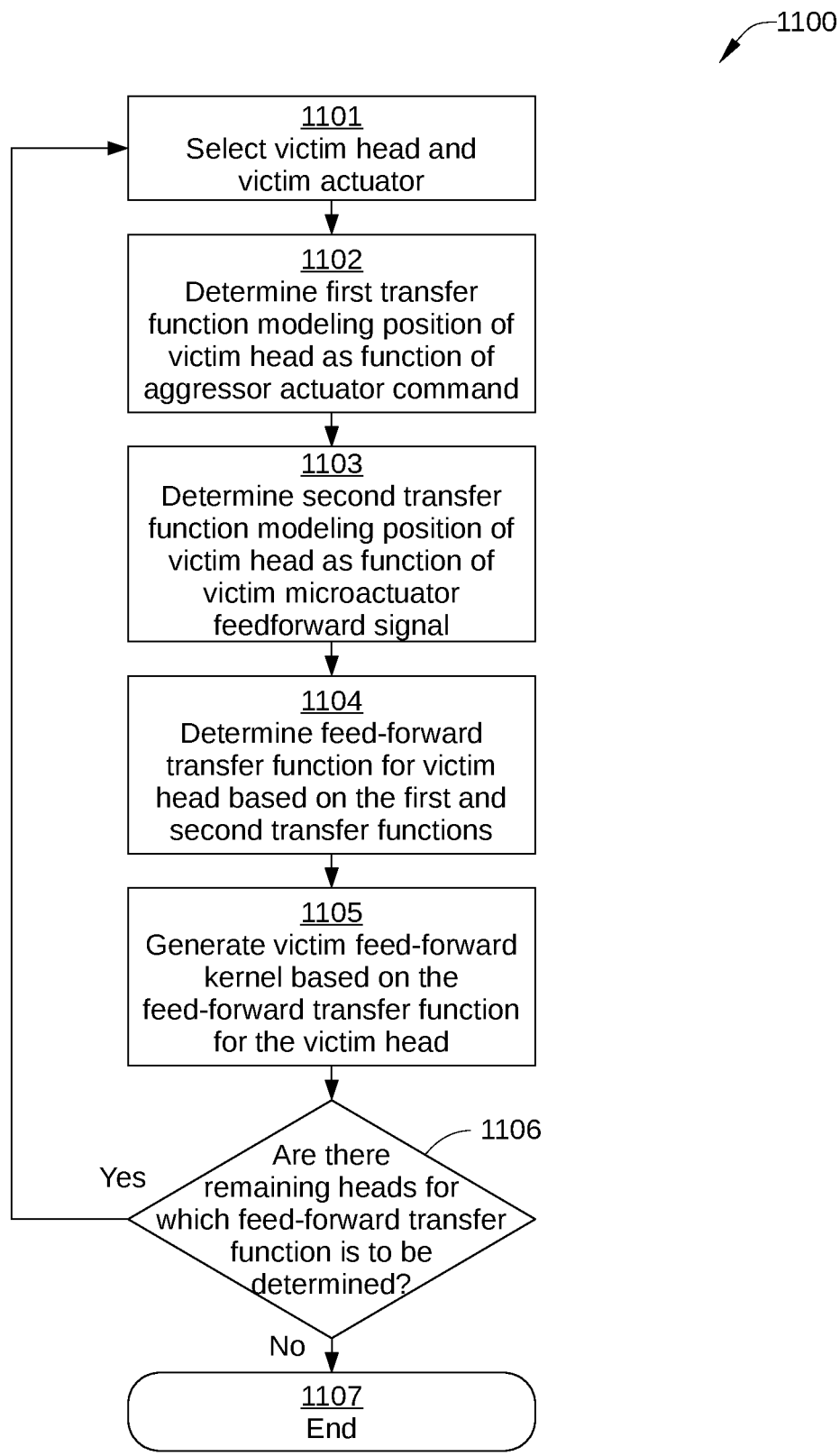
FIG. 11 sets forth a flowchart of method steps for determining values for a victim feedforward generator in a multi-actuator hard disk drive, according to an embodiment.

FIG. 11 sets forth a flowchart of method steps for determining values for a victim feedforward generator in a multi-actuator HDD, according to an embodiment. In the embodiment, a different set of values for the victim feedforward transfer function is determined for each magnetic head of the multi-actuator HDD. In some embodiments, the method steps are performed in HDD 100 as part of a calibration/start-up process. Although the method steps are described in conjunction with HDD 100 of FIGS. 1-10B, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software- or firmware-implemented logic, and/or as hardware-implemented logic circuits.

A method 1100 begins at step 1101, when a suitable controller (i.e., microprocessor-based controller 133 and/or motor-driver chip 125) selects a victim read/write head 127 from the read/write heads associated with VCM 128A or VCM 128B. The selected read/write head 127 and associated actuator (either VCM 128A or VCM 128B) are then designated as the victim head and the victim actuator, respectively, while another actuator is designated as the aggressor actuator.

In step 1102, the controller determines a first transfer function that models the radial position of the victim head as a function of a control signal applied to the aggressor actuator. In some embodiments, in an instance in which VCM 128A is the aggressor actuator and VCM 128B is the victim actuator, the first transfer function models radial position 905 of the currently active read/write head associated with VCM 128B as a function of VCM control signal 643 applied to VCM 128A. In one such embodiment, the first transfer function can model radial position 905 as a function of filtered VCM control signal 943, which is VCM control signal 643 after passing through notch filter 912. Alternatively, in another embodiment, the first transfer function models radial position 905 as a function of VCM control signal 947 prior to being processed by notch filter 912. One process by which the controller determines the first transfer function is described below in conjunction with FIG. 12.

In step 1103, the controller determines a second transfer function that models the radial position of the victim head as a function of a feedforward signal added to the control signal that is applied to a microactuator 228 and/or 229 for positioning the victim head. For example, in an instance in which VCM 128A is the aggressor actuator and VCM 128B is the victim actuator, in some embodiments the second transfer function models radial position 905 of the currently active read/write head associated with VCM 128B as a function of victim feedforward signal 903 for microactuator 928B. One process by which the controller determines the second transfer function is described below in conjunction with FIG. 8.

In step 1104, the controller determines a feedforward transfer function for the current victim head. The feedforward transfer function models a feedforward correction signal for the victim head as a function of a control signal supplied to the aggressor actuator. For example, in an instance in which VCM 128A is the aggressor actuator and VCM 128B is the victim actuator, in some embodiments the feedforward transfer function models victim feedforward signal 903 (the output of the feedforward transfer function) as a function of filtered VCM control signal 943 for VCM 128A (the input of the feedforward transfer function). In some embodiments, the controller determines a feedforward transfer function for the current victim head based on a ratio of the first transfer function determined for the victim head in step 1102 and the second transfer function determined for the victim head in step 1103. So that the feedforward transfer function substantially cancels the effect of filtered VCM control signal 943, the feedforward transfer function is multiplied by −1.

In step 1105, the controller generates a victim feedforward kernel for the current victim head. In some embodiments, the victim feedforward kernel is based on the feedforward transfer function determined in step 1104. For example, in one such embodiment, the controller generates a plurality of values for the victim feedforward kernel for the current victim head by determining an inverse discrete Fourier transform of values associated with the first transfer function. The controller then stores the plurality of values for the victim feedforward kernel in a memory of HDD 100, such as RAM 134 and/or flash memory device 135. Alternatively or additionally, the plurality of values can be programmed into one or more control algorithms of HDD 100.

In step 1106, the controller determines whether there are any remaining read/write heads 127 in HDD 100 for which a feedforward transfer function is to be determined. If yes, method 1100 returns to step 1101; if no, method 1100 proceeds to step 1107 and terminates.

In some embodiments, a feedforward transfer function is determined not only for each different read/write head 127 of HDD 100, but also for each read/write head 127 at each of multiple temperature ranges. Thus, temperature variations in the mechanical coupling between a victim actuator and an aggressor actuator can be accurately accounted for. In such embodiments, a different iteration of method 1100 is performed for each of the multiple temperature ranges. Thus, a different transfer function for the same read/write head 127 is determined for each of the different temperature ranges. For example, in one such embodiment, a different iteration of method 1100 is performed for each of the following temperature ranges of HDD 100: −5° C. to +5° C.; +5° C. to +15° C.; +15° C. to +25° C.; +25° C. to +35° C. In other embodiments, a different iteration of method 1100 is performed for any other temperature ranges, including larger temperature ranges than those described above, smaller temperature ranges than those described above, temperature ranges spanning different thermal ranges, etc. In other embodiments, a different iteration of method 1100 is performed for one or more temperature ranges, and kernel values are determined for those temperature ranges, plus other temperature ranges, using methods of interpolation or extrapolation known to one of skill in the art.

In some embodiments, a feedforward transfer function is determined not only for each different read/write head 127 of HDD 100, but also for various radial locations of each read/write head 127. Thus, variations in the mechanical coupling between a victim actuator and an aggressor actuator that depend upon the radial location of the victim head can be accurately accounted for. In such embodiments, a different iteration of method 1100 is performed for each of the multiple radial locations (e.g., proximate the ID, proximate the OD, and/or proximate a mid-diameter region). Thus, a different transfer function for the same read/write head 127 is determined for each of the different radial locations.

Figure 12:
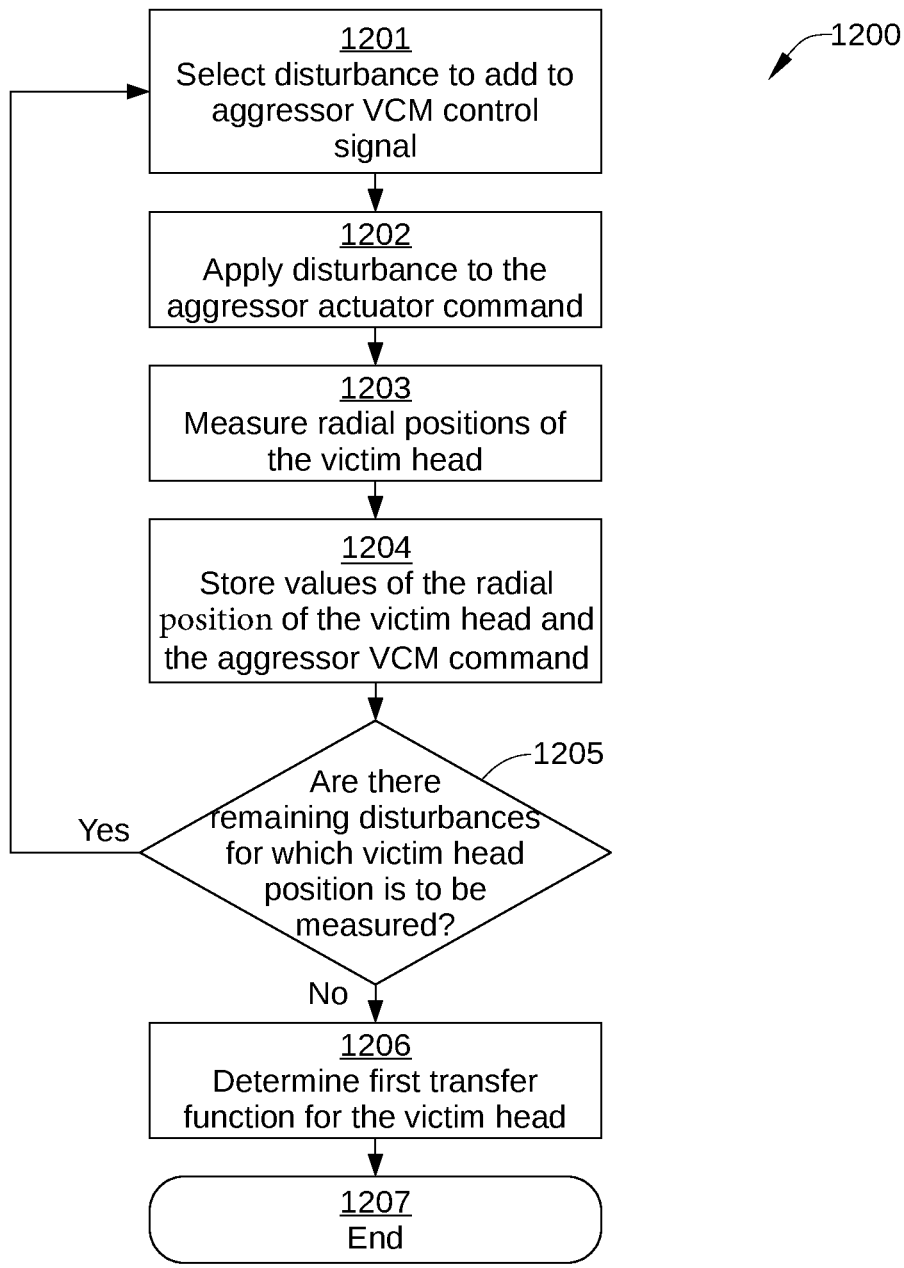
FIG. 12 sets forth a flowchart of method steps for determining a transfer function that models the radial position error of a victim head as a function of a control signal applied to an aggressor actuator, according to an embodiment.

FIG. 12 sets forth a flowchart of method steps for determining a transfer function that models the radial position of a victim head as a function of a control signal applied to an aggressor actuator, according to an embodiment. For consistency with the description of method 1100 in FIG. 11, such a transfer function is described herein as the "first transfer function." In some embodiments, the method steps are performed in HDD 100 as part of a calibration/start-up process. For example, the method steps of FIG. 12 may be implemented in step 1102 of method 1100. Although the method steps are described in conjunction with HDD 100 of FIGS. 1-10B, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software- or firmware-implemented logic, and/or as hardware-implemented logic circuits.

A method 1200 begins at step 1201, when a suitable controller (i.e., microprocessor-based controller 133 and/or motor-driver chip 125) selects a disturbance to be injected into or otherwise added to a control signal for an actuator that is currently designated as the aggressor actuator. For example, in an instance in which VCM 128A is the aggressor actuator and VCM 128B is the victim actuator, the controller selects a disturbance to be added to filtered VCM control signal 943 before being applied to VCM 128A. It is noted that VCM control signal 947 is generated as part of the closed loop servo control of the aggressor head and then modified to filtered VCM control signal 943. Generally, the controller selects the disturbance to be added to the VCM command from a plurality of disturbances that together facilitate the determination of the first transfer function. For example, the plurality of disturbances may include a range of different acceleration values that are each to be individually applied to the aggressor actuator during implementation of method 1200.

In some embodiments, the plurality of disturbances is selected to excite the mechanical systems of first control loop 920 and second control loop 930 over all frequencies of interest. In this way, the first transfer function measured in method 1200 more accurately captures the response of the mechanical and control systems of first control loop 920 and second control loop 930. In some embodiments, the different disturbances to be applied to VCM control signal 643 can be part of a sinusoidal waveform, a pulse of acceleration values, and/or selected from random noise. For example, in one embodiment, each disturbance to be applied to VCM control signal 643 is a sinewave of a different frequency. When each such disturbance is applied to VCM control signal 643, a complete spectrum of the first transfer function can be measured.

In some embodiments, a control signal for an aggressor actuator (e.g., VCM control signal 643) may be updated at the same rate at which the read/write head position 905 is determined for a victim actuator. Such systems are generally referred to as single-rate control systems. In other embodiments, a control signal for an aggressor actuator may be updated at a higher rate than the rate at which the read/write head position 905 is determined for the victim actuator. For example, in an embodiment, the control signal for an aggressor actuator might be updated at twice the rate at which the read/write head position 905 for the victim actuator is measured. Such systems are generally referred to as multi-rate control systems, and are known to one of skill in the art. For such systems, the relationship between the control signal for the aggressor actuator and the read/write head position 905 of the victim actuator can be represented by multiple transfer functions. For the example described above (in which VCM commands are updated at twice the rate at which the read/write head position is determined), the relationship between the aggressor control signal (e.g., VCM control signal 643) and the read/write head position (e.g., radial position 905) can be represented by two transfer functions; one transfer function between a signal that is made up of a first VCM control signal 643 that is sent to the aggressor VCM (VCM 128A) each servo sample, and the victim's read/write head position 905, and a second transfer-function between a signal that is made up of a second VCM control signal 643 that is sent to the aggressor VCM (VCM 128A) each servo sample and the victim read/write head position (radial position 905). For such systems, the disturbances to be applied to VCM control signal 643 could include disturbances to only the first of the two control signals for each servo sample, disturbances to only the second of the two control signals, or to both simultaneously. For such systems, determining the two transfer-functions could involve measuring the aggressor VCM control signal 643 and the response of the victim read/write head position to two or more different disturbance signals, and simultaneously solving for the two transfer-functions, based upon the results of the multiple experiments. Such signal processing is known to one of skill in the art.

Continuing with the case of a multi-rate control system, the processing that was previously described for FIG. 11 is extended to apply to two first transfer functions. In step 1102, the first transfer function would consist of two transfer functions. In step 1104, determining the feedforward transfer function for the victim head would consist of two transfer functions. In step 1105, the victim feedforward kernel would consist of two kernels; one which is applied to the first VCM control signal 643 that is applied to VCM 128A each servo sample, and another which is applied to the second VCM control signal 643 that is applied to VCM 128A each servo sample.

In step 1202, the controller applies the selected disturbance to the VCM command for the aggressor VCM. For example, in an instance in which VCM 128A is the aggressor actuator and VCM 128B is the victim actuator, the disturbance is added to filtered VCM control signal 643 before VCM control signal 643 is applied to VCM 128A. In one such embodiment, the disturbance is added to filtered VCM control signal 943 at injection point 929.

In step 1203, the controller measures the radial position of a read/write head 127 that is currently designated as the victim head. That is, the controller measures the response of the victim head (i.e., radial positions of the victim head over a certain time interval) to the disturbance applied in step 1202. The controller also measures the VCM commands applied to the aggressor actuator. For example, in an instance in which VCM 128A is the aggressor actuator and VCM 128B is the victim actuator, the controller measures radial position 905 of the currently active read/write head associated with VCM 128B (i.e., the victim head), and the commands that were applied to the VCM 128A (i.e., VCM control signal 643). The commands applied to the aggressor actuator are collected in step 1203 since such commands are not based solely on the selected disturbance applied in step 1202; such commands include controller-determined feedback values as well.

In some embodiments, the controller performs steps 1202 and 1203 multiple times to reduce the influence of random noise and other non-repeatable runout on the measured radial position of the victim head. For example, the controller may perform steps 1202 and 1203 over a plurality of rotations of a storage disk 110. Alternatively or additionally, in some embodiments, the controller performs steps 1202 and 1203 at multiple circumferential locations of a recording surface 112 to reduce the influence of repeatable runout on the measured radial position of the victim head. In such embodiments, the controller may also perform steps 1202 and 1203 over a plurality of rotations of a storage disk 110.

In some embodiments, the effects of synchronous runout (also known as "written-in runout") on the accuracy of measurements of the first transfer function are reduced. In such embodiments, the measurements associated with steps 1202 and 1203 are made in pairs. In such embodiments, each pair of measurements is performed with added disturbances of equal amplitude and shape, but opposite sign, and with starting times that are separated by an integer number of revolutions of the storage disk 110. The difference between the resulting victim position (e.g., victim PES 905) for such a pair of experiments should, to first order, be devoid of effects of synchronous runout, which might otherwise degrade the accuracy of the transfer-function measurement. The difference between the resulting commands that were applied to the aggressor actuator should similarly be, to first order, devoid of effects of synchronous runout.

In step 1204, the controller stores the values of the measured position of the victim head over the time extent of the experiment, and stores the values of the commands that were applied to the aggressor actuator over that same time extent. In some embodiments, the values stored are based on multiple measurements made when the controller performs steps 1202 and 1203 multiple times.

In step 1205, the controller determines whether there are any remaining disturbances for which a resultant radial position of the victim head is to be measured. If yes, method 1200 returns to step 1201; if no, method 1200 proceeds to step 1206.

In step 1206, the controller derives the first transfer function for the victim head based on the values stored over the multiple iterations of step 1204. In some embodiments, the transfer function is determined as the ratio of the spectrum of the victim measured position to the spectrum of the commands applied to the aggressor actuator. Method 1200 then proceeds to step 1207 and terminates.

Figure 13:
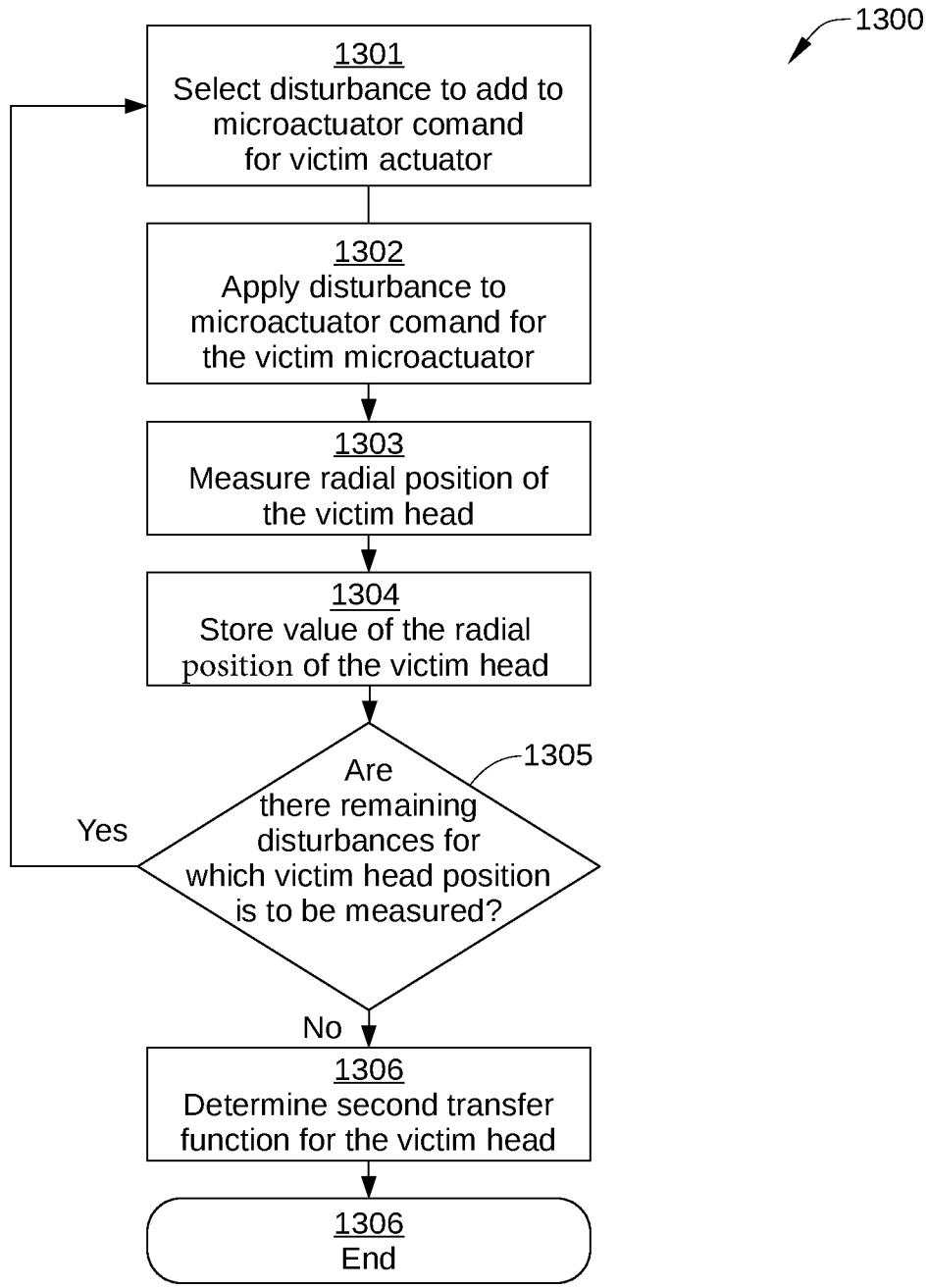
FIG. 13 sets forth a flowchart of method steps for determining a transfer function that models the radial position of a victim head as a function of a disturbance added to a control signal that is applied to a microactuator for positioning the victim head, according to an embodiment.

FIG. 13 sets forth a flowchart of method steps for determining a transfer function that models the radial position of a victim head as a function of a disturbance added to a control signal that is applied to a microactuator for positioning the victim head, according to an embodiment. For consistency with the description of method 1100 in FIG. 11, the transfer function is described herein as the "second transfer function." In some embodiments, the method steps are performed in HDD 100 as part of a calibration/start-up process. For example, the method steps of FIG. 13 may be implemented in step 1103 of method 1100. Although the method steps are described in conjunction with HDD 100 of FIGS. 1-12, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software- or firmware-implemented logic, and/or as hardware-implemented logic circuits.

A method 1300 begins at step 1301, when a suitable controller (i.e., microprocessor-based controller 133 and/or motor-driver chip 125) selects a disturbance (or microactuator control signal) for a microactuator that is configured to position a read/write head 127 currently designated as the victim head. For example, in an instance in which VCM 128A is the aggressor actuator and VCM 128B is the victim actuator, the controller selects a disturbance to microactuator control signal 645, which is to be applied to microactuator 928B. Generally, the controller selects the disturbance from a plurality of disturbances that together facilitate the determination of the second transfer function. For example, the plurality of microactuator commands may include a range of different acceleration values that are each to be individually applied to the microactuator during implementation of method 1300. In some embodiments, the different disturbances to be applied to microactuator control signal 645 can be part of a sinusoidal waveform, a pulse of acceleration values, and/or selected from random noise. For example, in one embodiment, each disturbance to be applied to microactuator control signal 645 is a sinewave of a different frequency. Further, any of the other techniques described above in conjunction with method 1200 for measuring the first transfer function can be employed for measuring the second transfer function in method 1300.

In step 1302, the controller adds the selected disturbance to the microactuator control signal for positioning the victim head. For example, in an instance in which VCM 128A is the aggressor actuator and VCM 128B is the victim actuator, the disturbance is added to microactuator control signal 645, which is then applied to microactuator 928B. In the embodiment illustrated in FIG. 9A, the disturbance can be injected between second servo controller 616 and notch filter 921. In the embodiment illustrated in FIG. 9B, the disturbance can be injected between notch filter 921 and microactuator 928B. In some embodiments, the selected disturbance is modified by a notch filter before being applied to the microactuator, and in other embodiments, the selected disturbance is modified by a second filtering portion of a notch filter before being applied to the microactuator.

In step 1303, the controller measures the radial position of a read/write head 127 that is currently designated as the victim head. For example, in an instance in which VCM 128A is the aggressor actuator and VCM 128B is the victim actuator, the controller measures radial position 905 of the currently active read/write head associated with VCM 128B (i.e., the victim head).

In some embodiments, the controller performs steps 1302-1304 multiple times to reduce the influence of random noise and other non-repeatable runout on the measured radial position of the victim head. For example, the controller may perform steps 1302-1304 over a plurality of rotations of a storage disk 110.

In step 1304, the controller stores the value of the measured position of the victim head over the time extent of the experiment. In some embodiments, the value stored is based on multiple measurements made when the controller performs steps 1302 and 1303 multiple times.

In step 1305, the controller determines whether there are any remaining disturbances for which a resultant radial position of the victim head is to be measured. If yes, method 1300 returns to step 1301; if no, method 1300 proceeds to step 1306.

In step 1306, the controller derives the second transfer function for the victim head based on the values stored over the multiple iterations of step 1304. In some embodiments, the transfer function is determined as the ratio of the spectrum of the victim measured position to the spectrum of the added disturbance. Method 1300 then proceeds to step 1307 and terminates.

Figure 14:
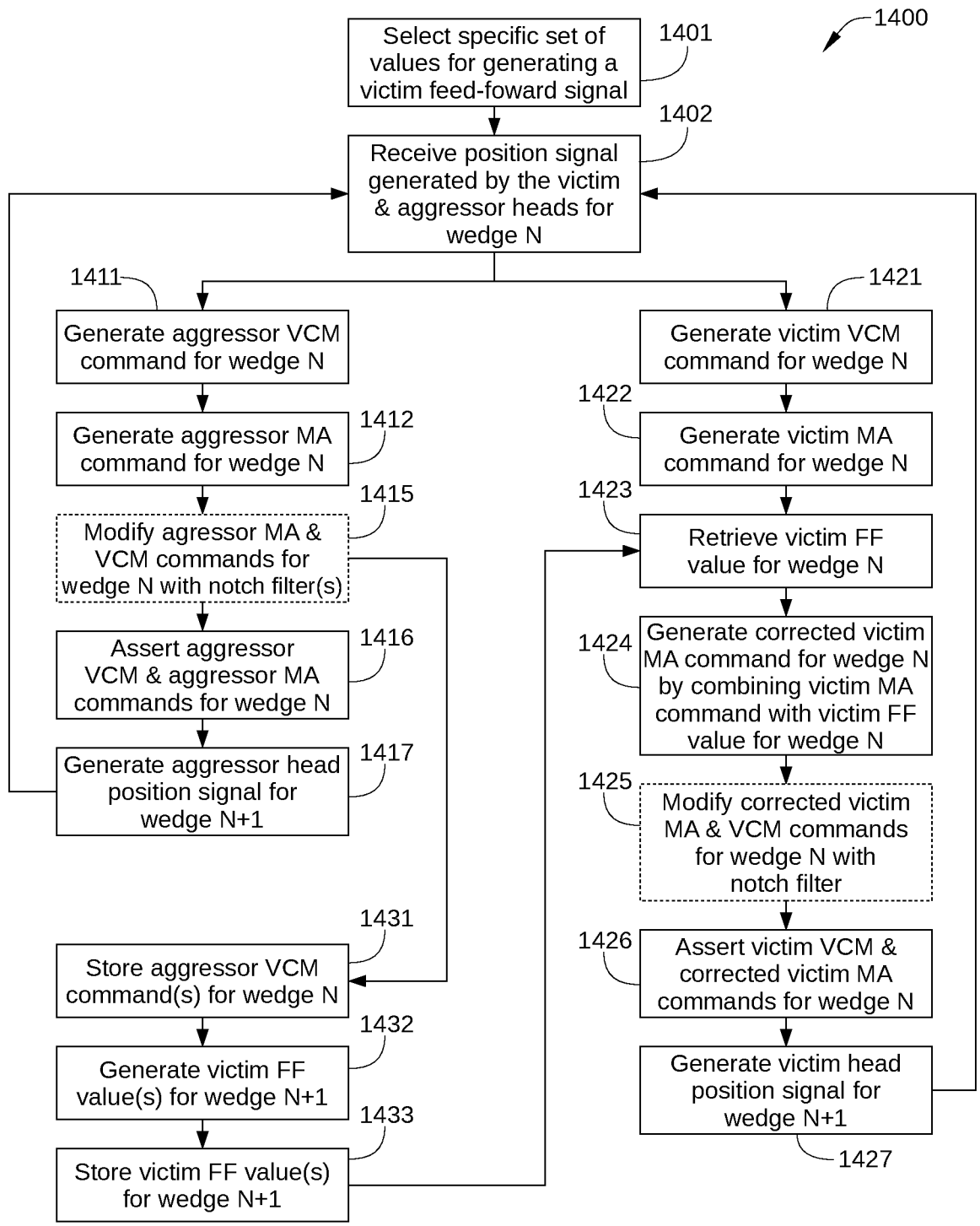
FIG. 14 sets forth a flowchart of method steps for controlling magnetic head position in a multi-actuator hard disk drive, according to an embodiment.

FIG. 14 sets forth a flowchart of method steps for controlling magnetic head position in a multi-actuator HDD, according to an embodiment. In some embodiments, the method steps are performed in HDD 100 during normal operation of HDD 100. Although the method steps are described in conjunction with HDD 100 of FIGS. 1-13, persons skilled in the art will understand that the method steps may be performed with other types of systems. The control algorithms for the method steps may reside in microprocessor-based controller 133, motor-driver chip 125, or a combination of both. The control algorithms can be implemented in whole or in part as software- or firmware-implemented logic, and/or as hardware-implemented logic circuits.

Prior to the method steps, values for a victim feedforward generator 683 of HDD 100 are determined, such as via method 1100 of FIG. 11. For example, in an embodiment in which HDD 100 includes N read/write heads 127, where N is a positive integer, at least N sets of values are determined and stored for use by victim feedforward generator 683. In the embodiment, each set of values corresponds to a kernel that is derived from a feedforward transfer function for a different read/write head 127. Thus, victim feedforward generator 683 can generate a different victim feedforward signal to a victim microactuator depending on which of the N read/write heads 127 of HDD 100 is currently the victim head.

In some embodiments, prior to the method steps, M sets of values, where M is a positive integer, are determined and stored for use by victim feedforward generator 683 for each of the N read/write heads 127. For example, in one such embodiment, each of the M different sets of values for a particular read/write head 127 corresponds to a different temperature range in which HDD 100 may operate and for which a different victim feedforward transfer function is applicable. Thus, in the embodiment, victim feedforward generator 683 can generate M different victim feedforward signals 903 for a single read/write head 127, depending on the temperature range in which HDD 100 is operating at the time. Alternatively or additionally, in some embodiments, prior to the method steps, K sets of values, where K is a positive integer, are determined and stored for use by victim feedforward generator 683 for each of the N read/write heads 127. For example, in one such embodiment, each of the K different sets of values for a particular read/write head 127 corresponds to a different radial location of the victim head. Thus, in the embodiment, victim feedforward generator 683 can generate K different victim feedforward signals 903 for a single read/write head 127, depending on the radial location of the victim head at the time. Further, in some embodiments, victim feedforward generator 683 can generate K×M different victim feedforward signals 903 for a single read/write head 127, depending on the radial location of the victim head and the temperature range in which HDD 100 is operating at the time.

A method 1400 begins at step 1401, when a suitable controller (i.e., microprocessor-based controller 133 and/or motor-driver chip 125) determines a specific set of values to be retrieved from a memory by victim feedforward generator 683 to generate an appropriate victim feedforward signal 903. For purposes of discussion below, the specific set of values to be retrieved from a memory by victim feedforward generator 683 to generate an appropriate victim feedforward signal will be referred to as a victim feedforward kernel. The controller then retrieves the specific set of values from the appropriate memory of HDD 100.

The controller determines the specific set of values based on which of the N read/write heads 127 of HDD 100 is currently designated to be the victim head. Additionally, in some embodiments, the controller determines the specific set of values further based on which of M different predetermined temperature ranges HDD 100 is currently operating in. Additionally or alternatively, in some embodiments, the controller determines the specific set of values further based on which of K different radial locations the victim head currently occupies. Thus, in some embodiments, the controller determines the specific set of values from N different sets of values; in other embodiments, the controller determines the specific set of values from N×M different sets of values; in other embodiments, the controller determines the specific set of values from N×K different sets of values; and in yet other embodiments, the controller determines the specific set of values from N×M×K different sets of values. In yet other embodiments, the controller may determine the set of values based upon a combination of one or more of the up to N×M×K different sets of values, using interpolation between two or more sets of values, based upon temperature range, victim location, or other operating parameters.

In some embodiments, all of the disk surfaces associated with actuator arm assembly 120A (for example, recording surfaces 112A-112D in FIG. 2) are servo-written in such a manner that the servo samples are aligned in time. In other words, a servo wedge on surface 112A passes under read/write head 227A at about the same time that a servo wedge on surface 112B passes under read/write head 227B, and so on. For this reason, the timing of commands sent to VCM 128A (as part of the response of first servo controller 615 to the measured position of any read/write head associated with that VCM) should be relatively independent of which read/write head is currently under servo control. In such a case, it is not necessary to have a different victim feedforward kernel for each individual combination of aggressor and victim head, because all aggressor heads can be treated similarly. When the servo wedges for different heads associated with a single actuator are not aligned in time, then it may be necessary to have a different victim feedforward kernel for each combination of aggressor and victim head.

In step 1402, the controller receives or determines a radial position generated by the victim head, such as radial position 905, and a radial position generated by the aggressor head. Generally, the controller receives or determines the position signal generated by the victim head as the victim head passes over a servo wedge (e.g., servo wedge N in FIG. 5) on a recording surface 112 of HDD 100 associated with the victim head. Similarly, the controller receives or determines the position signal generated by the aggressor head as the aggressor head passes over a servo wedge (e.g., servo wedge N in FIG. 5) on a recording surface 112 of HDD 100 associated with the aggressor head. The position signal for the victim head is employed to enable the victim servo loop to function, and the position signal for the aggressor head is employed to enable the aggressor servo loop to function.

In step 1411, the controller generates an aggressor VCM control signal for moving the aggressor actuator of HDD 100. The controller generates the aggressor VCM control signal based on aggressor head position signal received in step 1402. In instances in which VCM 128A is the aggressor actuator and VCM 128B is the victim actuator, the controller generating the aggressor VCM control signal corresponds to first servo controller 615 in FIG. 6.

In step 1412, the controller generates a microactuator control signal for the aggressor head based on the radial position received or determined in step 1402.

In optional step 1415, the aggressor VCM control signal generated in step 1411 and/or the microactuator control signal for the aggressor head generated in step 1412 is modified with one or more notch filters, such as notch filters 911 or 912. For example, in an embodiment, a notch filter modifies the microactuator signal for the aggressor head to produce a filtered microactuator signal for the aggressor microactuator. In some embodiments, the microactuator control signal for the aggressor head passes through all portions of the notch filter, whereas in other embodiments, the microactuator control signal for the aggressor head does not pass through all filtering portions of the notch filter. Alternatively or additionally, in some embodiments, the aggressor VCM control signal for the aggressor head is processed by a notch-filter.

In step 1416, the controller asserts the aggressor VCM control signal and the microactuator control signal. Thus, the aggressor VCM control signal is asserted by the aggressor actuator (e.g., VCM 128A) and the microactuator control signal for the aggressor head is asserted by the aggressor microactuator (e.g., one of microactuators 228A-D). Generally, the aggressor VCM control signal is applied to the aggressor actuator and the microactuator control signal for the aggressor head is applied to the aggressor microactuator prior to the aggressor head passing over the next servo wedge. For example, when the controller receives or determines the position signal in step 1402 immediately after the aggressor head passes over servo wedge N in FIG. 5, in step 1416, the controller asserts the aggressor VCM control signal and the microactuator control signal prior to the aggressor head passing over servo wedge N+1 in FIG. 5. In this way, the radial position and/or velocity profile of the aggressor head is modified prior to the aggressor head passing over servo wedge N+1.

In step 1417, the aggressor head generates another position signal as the aggressor head passes over the next servo wedge. Upon completion of step 1417, method 1400 returns back to step 1402.

It is noted that in some embodiments, step 1427 occurs substantially concurrently with step 1417. That is, in such embodiments, the victim head passes over the next servo wedge on the recording surface associated with the victim head at approximately the same time that the aggressor head passes over the next servo wedge on the recording surface associated with the aggressor head. Therefore, in such embodiments, the victim head generates another position signal for the victim head in step 1427 at approximately the same time that the aggressor head generates another position signal for the aggressor head in step 1417. In such embodiments, each servo wedge on the recording surface associated with the aggressor head is circumferentially aligned with a respective servo wedge on the recording surface associated with the aggressor head, as shown in FIGS. 4 and 5.

Step 1431 is performed upon completion of step 1415, in which an aggressor VCM control signal or signals for moving the aggressor actuator of HDD 100 is modified by (for example) notch filter 912. In step 1431, the controller stores the aggressor modified VCM command generated in step 1415 in a memory of HDD 100. For example, in an instance in which VCM 128A is the aggressor actuator, the controller stores the aggressor VCM control signal in aggressor VCM command buffer 674 for first servo controller 615. In alternative embodiments, the input value for step 1431 is provided by step 1411 instead by step 1415. In such embodiments, the VCM command(s) stored are those that are generated by the controller for moving the aggressor actuator of HDD 100.

In step 1432, the controller generates a victim feedforward signal (e.g., victim feedforward signal 903 in FIG. 9) or signals based on the aggressor VCM control signal generated in step 1411 and on the set of values selected in step 1401. The set of values is derived from the appropriate feedforward transfer function for the victim head. Generally, the feedforward transfer function models commands to be added to the microactuator control signal as a function of the aggressor VCM control signal generated in step 1403, as well as recent previous values of that aggressor VCM control signal, e.g., the J most recent values of the aggressor VCM control signal. In some embodiments, the J most recent values of the aggressor VCM control signal are stored in a memory of HDD 100, such as aggressor VCM command buffer 674 or 684.

In some embodiments, for a particular read/write head 127, victim feedforward signal 903 is generated using the feedforward kernel for that particular read/write head 127. In one such embodiment, a value for the victim feedforward signal is calculated using Equation 1:

$$victimFF(j) = \sum_{k=W}^{J-1} \text{Kernel}(k) * VCMCMD(j-k) \quad (1)$$

where victimFF(j) is the $j^{th}$ (current) value of victim feedforward signal 903 for the particular read/write head 127, Kernel(k) is the kth kernel element, and VCMCMD(j) is the $j^{th}$ VCM-CMD, and W is the wedge offset number for HDD 100. According to various embodiments, wedge offset number W is an integer greater than 0. As a result, the first W victim feedforward kernel values are effectively forced to be zero. The integer J is the number of kernel elements that are included in the kernel for the particular read/write head 127. In some embodiments, J is selected so that kernel elements past Kernel(J-1) are very small. That is, generally, Kernel(j) begins with a particular magnitude (that can vary significantly from one sample to the next), and, over time, Kernel(j) gradually gets smaller (though possibly with increasing and decreasing oscillations). Thus, once sample #J, is reached, Kernel(j) typically approaches zero.

For the case of a multi-rate control system (for example one in which the VCM control signal 643 is updated at twice the rate at which the victim's read/write head 905 is determined), the formula would be extended to Equation 2:

$$victimFF(j) = \sum_{k=W}^{J-1} \text{Kernel}_0(k) * VCMCMD_0(j-k) + \sum_{k=W}^{J-1} \text{Kernel}_1(k) * VCMCMD_1(j-k) \quad (2)$$

Where $VCMCMD_0(j)$ is the $j^{th}$ value of the first VCM-CMD of each servo sample, $VCMCMD_1(j)$ is the $j^{th}$ value of the second VCM-CMD of each servo sample, $Kernel_0(k)$ is the kth kernel element (applied to first VCM-CMDs), and $Kernel_1(k)$ is the kth kernel element (applied to the second VCM-CMDs).

In step 1433, the controller stores the victim feedforward signal generated in step 1432 in a memory of HDD 100. For example, in an instance in which VCM 128A is the aggressor actuator, the controller stores the aggressor VCM control signal in victim feedforward value buffer 685 for second servo controller 616. The controller further stores a corresponding servo wedge number 802 that indicates a servo wedge that is offset by the wedge offset value.

In step 1421, the controller generates a victim VCM control signal for moving the victim actuator of HDD 100. The controller generates the victim VCM control signal based on victim head position signal received in step 1402. In instances in which VCM 128A is the aggressor actuator and VCM 128B is the victim actuator, the controller generating the victim VCM control signal corresponds to second servo controller 616 in FIG. 6.

In step 1422, the controller generates a microactuator control signal for the victim head based on the radial position received or determined in step 1402.

In step 1423, the controller retrieves a suitable victim feedforward entry 801 from a memory of HDD 100, such as victim feedforward value buffer 685. The controller determines the suitable victim feedforward entry 801 to retrieve based on servo wedge numbers 802. In some embodiments, each servo wedge number 802 indicates a respective servo wedge of a recording surface associated with the aggressor actuator. In such embodiments, the controller selects the victim feedforward entry 801 associated with the servo wedge number 802 in victim feedforward value buffer 685 that indicates a servo wedge of the recording surface associated with the aggressor actuator that is offset from the servo wedge N by the preset wedge offset value, where servo wedge N is the servo wedge from which the position signal in step 1402 is generated. For example, when the preset wedge offset value is two, the controller selects the victim feedforward entry 801 associated with the servo wedge number 802 that indicates servo wedge N−2 of the recording surface associated with the aggressor actuator. Alternatively, in some embodiments, each servo wedge number 802 indicates a respective servo wedge of a recording surface associated with the victim actuator. In such embodiments, the controller selects the victim feedforward entry 801 associated with the servo wedge number 802 in victim feedforward value buffer 685 that indicates the servo wedge from which the position signal in step 1402 is generated, for example, servo wedge N of the recording surface associated with the victim actuator.

In step 1424, the controller combines the victim microactuator control signal and the victim feedforward signal generated in step 1404 to produce a corrected microactuator signal.

In optional step 1425, the victim VCM control signal generated in step 1421 and/or the corrected victim microactuator control signal generated in step 1424 is modified via one or more notch filters, such as notch filters 921 or 922. For example, in an embodiment, a notch filter modifies the corrected microactuator signal for the victim head to produce a filtered corrected microactuator signal for the victim microactuator. In some embodiments, the corrected microactuator control signal for the victim head passes through all portions of the notch filter, whereas in other embodiments, the filtered corrected microactuator control signal for the victim head does not pass through all filtering portions of the notch filter. Alternatively or additionally, in some embodiments, the victim VCM control signal for the aggressor head is processed by a notch-filter.

In step 1426, the controller asserts the victim VCM control signal and the filtered corrected microactuator control signal. Thus, the victim VCM control signal is applied to the victim actuator (e.g., VCM 128B) and the filtered corrected microactuator control signal for the victim head is applied to the victim microactuator (e.g., one of microactuators 228E-H). Generally, the victim VCM control signal is applied to the victim actuator and the filtered corrected microactuator control signal for the victim head is applied to the victim microactuator prior to the victim head passing over the next servo wedge. For example, when the controller receives or determines the position signal in step 1402 immediately after the victim head passes over servo wedge N in FIG. 5, in step 1426, the controller asserts the victim VCM control signal and the filtered corrected microactuator control signal prior to the victim head passing over servo wedge N+1 in FIG. 5. In this way, the radial position and/or velocity profile of the victim head is modified prior to the victim head passing over servo wedge N+1.

In step 1427, the victim head generates another position signal as the victim head passes over the next servo wedge. Upon completion of step 1427, method 1400 returns back to step 1402.

Implementation of method 1400 enables a suitable victim feedforward signal to be determined and added to a microactuator for a victim head, thereby reducing or eliminating the effect of aggressor actuator motion on the positioning accuracy of the victim head.

In embodiments described above, a first servo wedge on one recording surface of HDD 100 and a second servo wedge on another recording surface of HDD 100 that is circumferentially aligned with the first servo wedge are each identified with the same index value. For example, in the embodiment illustrated in FIG. 5, servo wedge N on the recording surface associated with the aggressor head is aligned with servo wedge N on the recording surface associated with the victim head. In practice, a servo wedge on one recording surface of an HDD may be identified with a different index value than a circumferentially aligned servo wedge on a different recording surface of the HDD. Thus, the use of an identical index value for circumferentially aligned servo wedges on different recording surfaces is merely an example embodiment.

Further, in some HDDs, servo wedges on one recording surface of an HDD may not be circumferentially aligned with any of the servo wedges on a different recording surface of the HDD. That is, the servo wedges on one recording surface may be circumferentially offset from the servo wedges on a different recording surface of an HDD, for example by one half the circumferential distance between servo wedges. In such HDDs, the various embodiments described herein may still be beneficially implemented by one of skill in the art. In one such embodiment, a servo wedge N on a first recording surface of an HDD is positioned circumferentially between two servo wedges on a second recording surface of the HDD. For example, the servo wedge N on the first recording surface may be circumferentially positioned between a servo wedge N and a servo wedge N+1 on the second recording surface. In such an embodiment, a preset wedge offset value can be zero.

While the foregoing is directed to embodiments of the present invention, other and further embodiments of the invention may be devised without departing from the basic scope thereof, and the scope thereof is determined by the claims that follow.

I claim:

1. A method of controlling magnetic head position in a disk drive that includes a first head for accessing a first recording surface and a second head for accessing a second recording surface, the method comprising:
   determining a first control signal that causes a first actuator to position the first head relative to the first recording surface, wherein the first control signal is based on a first position signal generated by the first head passing over a first servo wedge disposed on the first recording surface;
   based on the first control signal, determining a feedforward value that modifies a second control signal that is determined based on a second position signal, wherein the second position signal is generated by the second head passing over a second servo wedge disposed on the second recording surface and is associated with a wedge index value, and wherein the second control signal causes a second actuator that is coupled to the second head to position the second head relative to the second recording surface;
   based on the wedge index value, determining that the second position signal is generated by the second head passing over the second servo wedge; and
   modifying the second control signal with the feedforward value.

2. The method of claim 1, further comprising, after modifying the second control signal with the feedforward value, applying the second control signal to the second actuator.

3. The method of claim 2, wherein applying the second control signal to the second actuator comprises applying the second control signal to the second actuator before the second head passes over a third servo wedge that is disposed on the second recording surface and is circumferentially adjacent to the second servo wedge.

4. The method of claim 1, wherein the second actuator is configured to radially position the second head and not the first head.

5. The method of claim 1, wherein the first actuator includes a voice coil motor that is configured to radially position the first head and not the second head.

6. The method of claim 1, wherein the first servo wedge and the second servo wedge are separated by a preset wedge offset value.

7. The method of claim 6, wherein the preset wedge offset value is a positive integer equal to or greater than 1.

8. The method of claim 6, wherein the preset offset value is a positive integer equal to or less than 5.

9. The method of claim 6, wherein the first servo wedge and the second servo wedge are physically offset from each other circumferentially by less than one complete servo wedge separation and the preset wedge offset value is equal to 0.

10. The method of claim 9, wherein the first servo wedge and the second servo wedge are physically offset from each other circumferentially by one half of a complete servo wedge separation and the preset wedge offset value is equal to 0.

11. The method of claim 1, wherein determining the feedforward value comprises generating a feedforward signal based on a first transfer function that models the feedforward signal as a function of the first control signal.

12. The method of claim 11, wherein the first transfer function is derived based on a second transfer function that models a radial position of the second head as a function of the second control signal and a third transfer function that models the radial position of the second head as a function of the first control signal.

13. The method of claim 12, wherein the second transfer function is derived based on a measurement of the radial position of the second head in response to a specific value of the second control signal.

14. The method of claim 12, wherein the third transfer function is derived based on a measurement of the radial position of the second head in response to a specific value being added to the first control signal.

15. A disk drive comprising:
a first head for accessing a first recording surface and a second head for accessing a second recording surface;
a first microactuator configured to move the first head relative to the first recording surface;
a second microactuator configured to move the second head relative to the second recording surface;
a first arm that is coupled to a first voice coil motor (VCM) and to which the first head and the first microactuator are mounted;
a second arm that is coupled to a second VCM and to which the second head and the second microactuator are mounted; and
a controller configured to:
in response to a first position signal generated by the first head when the first head passes over a first servo wedge disposed on the first recording surface, determine a first control signal that causes the first VCM to position the first head relative to the first recording surface;
based on the first control signal, determine a feedforward value that modifies a second control signal that is determined based on a second position signal, wherein the second position signal is generated by the second head passing over a second servo wedge disposed on the second recording surface and is associated with a wedge index value, and wherein the second control signal causes the second microactuator to position the second head relative to the second recording surface;
based on the wedge index value, determine that the second position signal is generated by the second head passing over the second servo wedge; and
modify the second control signal with the feedforward value.

16. The disk drive of claim 15, wherein the controller is further configured to, after modifying the second control signal with the feedforward value, cause the second microactuator to move the second head relative to the second recording surface based on the second control signal.

17. The disk drive of claim 15, wherein the controller is further configured to store the feedforward signal and the wedge index value prior to the second head passing over the second servo wedge.

18. The disk drive of claim 15, wherein the second servo wedge is circumferentially offset from the first servo wedge by a preset wedge offset value for the disk drive.

19. The disk drive of claim 15, further comprising a memory configured to store, prior to modifying the second control signal with the feedforward value, at least one of the feedforward value or a resultant value for the second control signal that is generated by modifying the second control signal with the feedforward value.

20. The disk drive of claim 15, further comprising a memory configured to store, prior to the second head passing over the second servo wedge, a third control signal that causes the first actuator to position the first head relative to the first recording surface, wherein the third control signal is generated based on the first head passing over a third servo wedge that is circumferentially positioned between the first servo wedge and the second servo wedge.

* * * * *